US010606755B2

(12) United States Patent
Vasudevan et al.

(10) Patent No.: US 10,606,755 B2
(45) Date of Patent: Mar. 31, 2020

(54) METHOD AND SYSTEM FOR PERFORMING DATA MOVEMENT OPERATIONS WITH READ SNAPSHOT AND IN PLACE WRITE UPDATE

(71) Applicant: Intel Corporation, Santa Clara, CA (US)

(72) Inventors: Anil Vasudevan, Portland, OR (US); Venkata Krishnan, Ashland, MA (US); Andrew J. Herdrich, Hillsboro, OR (US); Ren Wang, Portland, OR (US); Robert G. Blankenship, Tacoma, WA (US); Vedaraman Geetha, Fremont, CA (US); Shrikant M. Shah, Chandler, AZ (US); Marshall A. Millier, Banks, OR (US); Raanan Sade, Haifa (IL); Binh Q. Pham, Hillsboro, OR (US); Olivier Serres, Hudson, MA (US); Chyi-Chang Miao, Sharon, MA (US); Christopher B. Wilkerson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 15/640,060

(22) Filed: Jun. 30, 2017

(65) Prior Publication Data

US 2019/0004958 A1 Jan. 3, 2019

(51) Int. Cl.
*G06F 12/0868* (2016.01)
*G06F 12/0897* (2016.01)
(Continued)

(52) U.S. Cl.
CPC .......... *G06F 12/0868* (2013.01); *G06F 3/065* (2013.01); *G06F 3/068* (2013.01);
(Continued)

(58) Field of Classification Search
CPC ............. G06F 12/0811; G06F 12/0897; G06F 2212/283; G06F 12/0806; G06F 12/0822;
(Continued)

(56) References Cited

U.S. PATENT DOCUMENTS

| 4,394,731 A | 7/1983 | Flusche et al. |
| 6,055,605 A * | 4/2000 | Sharma ................. G06F 12/084 |
| | | 711/130 |

(Continued)

FOREIGN PATENT DOCUMENTS

JP 2000-347933 A 12/2000

OTHER PUBLICATIONS

European Search Report and Search Opinion, EP App. No. 19160052.7, dated Aug. 13, 2019, 9 pages.

(Continued)

*Primary Examiner* — Zhuo H Li
(74) *Attorney, Agent, or Firm* — Nicholson De Vos Webster & Elliott LLP

(57) ABSTRACT

Method and system for performing data movement operations is described herein. One embodiment of a method includes: storing data for a first memory address in a cache line of a memory of a first processing unit, the cache line associated with a coherency state indicating that the memory has sole ownership of the cache line; decoding an instruction for execution by a second processing unit, the instruction comprising a source data operand specifying the first memory address and a destination operand specifying a memory location in the second processing unit; and responsive to executing the decoded instruction, copying data from the cache line of the memory of the first processing unit as identified by the first memory address, to the memory location of the second processing unit, wherein responsive
(Continued)

to the copy, the cache line is to remain in the memory and the coherency state is to remain unchanged.

21 Claims, 24 Drawing Sheets

(51) Int. Cl.
*G06F 3/06* (2006.01)
*G06F 12/0811* (2016.01)
*G06F 12/0871* (2016.01)

(52) U.S. Cl.
CPC ........ *G06F 3/0619* (2013.01); *G06F 12/0811* (2013.01); *G06F 12/0871* (2013.01); *G06F 12/0897* (2013.01); *G06F 2212/1024* (2013.01); *G06F 2212/283* (2013.01); *G06F 2212/311* (2013.01); *G06F 2212/6046* (2013.01)

(58) Field of Classification Search
CPC ....... G06F 2212/1032; G06F 2212/313; G06F 2212/621; G06F 12/0815; G06F 9/3834; G06F 12/0868; G06F 12/0871; G06F 2212/311; G06F 2212/6046; G06F 3/0619; G06F 3/065; G06F 3/068
See application file for complete search history.

(56) References Cited

U.S. PATENT DOCUMENTS

| | | | |
|---|---|---|---|
| 6,219,760 | B1 | 4/2001 | McMinn |
| 6,324,622 | B1 * | 11/2001 | Okpisz ................ G06F 12/0811 711/141 |
| 9,563,425 | B2 * | 2/2017 | Hughes ................ G06F 9/30036 |
| 2005/0268039 | A1 | 12/2005 | Archambault et al. |
| 2009/0172294 | A1 * | 7/2009 | Fryman ............... G06F 12/0817 711/141 |
| 2016/0055083 | A1 * | 2/2016 | Rozario ................ G06F 12/084 711/125 |
| 2016/0092366 | A1 | 3/2016 | Pal et al. |
| 2016/0110287 | A1 * | 4/2016 | Bronson ............. G06F 12/0815 711/141 |
| 2016/0179672 | A1 * | 6/2016 | Dell .................... G06F 12/0806 711/122 |
| 2016/0357664 | A1 | 12/2016 | Reed |
| 2018/0293693 | A1 * | 10/2018 | Ray ........................... G06T 1/20 |
| 2019/0303303 | A1 * | 10/2019 | Krishnan ............. G06F 12/0811 |

OTHER PUBLICATIONS

Non-Final Office Action, U.S. Appl. No. 15/940,719, dated Dec. 23, 2019, 13 pages.

* cited by examiner

METHOD AND SYSTEM FOR PERFORMING DATA MOVEMENT OPERATIONS WITH READ SNAPSHOT AND IN PLACE WRITE UPDATE

BACKGROUND

Field of the Invention

The various embodiments of the invention described herein relate generally to the field of processing logic, microprocessors, and associated instruction set architecture that, when executed by the processor or other processing logic, perform logical, mathematical, or other functional operations. In particular, the disclosure relates to instructions and logic to provide data movement operations with read snapshot and in place write update.

Description of the Related Art

Modern processors often include instructions to provide operations that are computationally intensive, but offer a high level of data parallelism that can be exploited through an efficient implementation using various data storage devices. For example, in pipeline parallelism, each loop iteration may be split into stages, and hardware threads may operate concurrently on different stages from different iterations. In this approach, a prior stage of an iteration, i, acts as a producer to a consumer, next stage of the iteration, i, and while one hardware thread operates on the next stage of iteration, i, another hardware thread operates concurrently on a prior stage of iteration, i+1. Thus a serial software process is queued from hardware thread to hardware thread and may exploit the parallelism of multicore and/or multi-threaded processors.

One of the drawbacks to software pipeline parallelism is that data sharing and movement between multiple cores may incur significant performance delays along with expensive increases in coherency traffic, power use and energy consumption. Some proposed solutions introduce a kind of message passing architecture, and/or software-managed memories without coherency support, to avoid the built-in cache coherency increases in traffic, power requirements and energy consumption, by putting the burden onto software. One drawback may be that considerable development and maintenance effort is added to the responsibilities of the software programmers. To date, potential solutions to such performance limiting issues, high energy consumption worries, and other bottlenecks have not been adequately explored.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
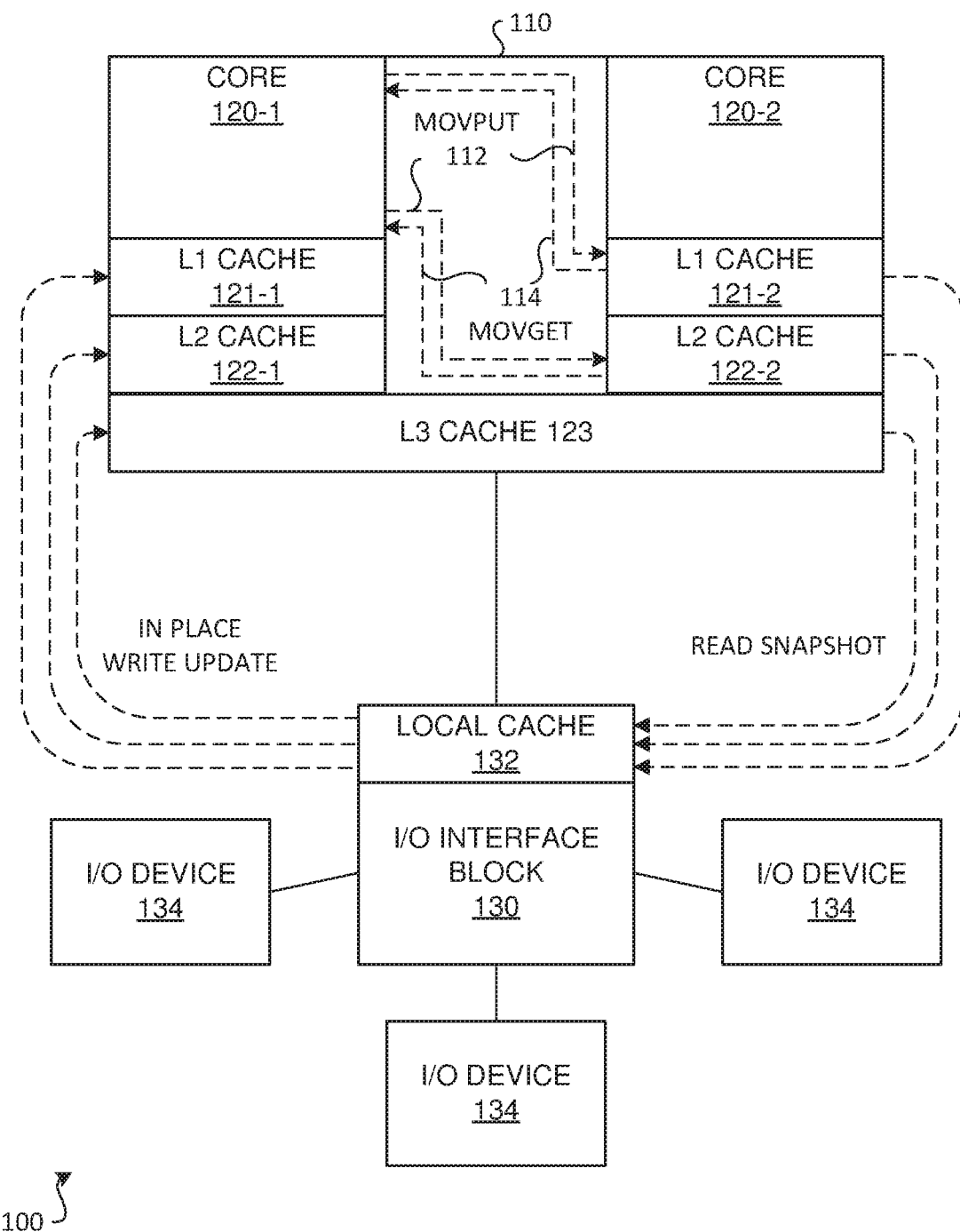
FIG. 1 is a block diagram illustrating an overview of some of the transactions that may be accomplished by embodiments of the present invention.

Embodiments of method and system for performing data movement operations with read snapshot and in place write update are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

Data movement services between producers and consumers (e.g., threads on IA cores) move copies of data between them through read and write operations. For optimal performance, producers and consumers save copies of the data in their local caches based on locality considerations. As producers and consumers update and seek data, these locality considerations are altered. For example, in some coherent memory architectures, the act of reading or updating data by input/output (I/O) devices through I/O interface blocks also changes the data's coherency state and position in a cache hierarchy. In other situations, the messaging system running on a single cache-coherent node (e.g., a processor) performs unintended transfer of the producer's cache line ownership to the consumer, when in fact, it is only the data that needed to be transferred to the consumer's address. These changes in locality consideration not only degrade performance, but also consume power, coherency bandwidth, and cache space. High speed I/O interfaces where the data is consumed/produced by the CPU from/to I/O, data flow architectures that use core to core communications to implement messaging/pipelining, or core to cache operations finely tuned for select application data access patterns are some example usages that fall in this category.

Existing solutions are either not optimal or unable to perform the desired functions. For example, in I/O to Core data transfers, cache locality for I/O produced data consumed by a core and for core produced data consumed by I/O changes when data is moved between core and I/O. This means that a read operation by an I/O interface block for a line that is currently resident in the first level cache (L1) would cause the line to be evicted from that level in the caching hierarchy to lower levels, which in most cases, is the Last Level Cache (LLC). Similarly, a write operation via direct memory access (DMA) operation for a line that happens to be in the L1 cache and actively used by an application would cause the line to be evicted from the L1 cache to the LLC. In a high speed I/O environment, these operations are common and cause a number of data transfers between various cache levels, causing unnecessary data movement and coherency traffic that increases latency, reduces throughput and increases power.

In core to core data transfers, messaging systems use MEMCPY semantics to achieve producer core to consumer core data transfers. These transfers incur migration of producer cache line ownership to the consumer when operating in the same cache-coherent domain. As a result, producer data and addresses occupy cache slots in the consumer's local caches, consuming valuable cache space and incurring additional coherency traffic.

Aspects of the present invention are directed to special read and write operations that, when executed, allow data to be sourced or updated in situ with respect to the caching hierarchy and coherency. In one embodiment, a read snapshot operation initiated by a consumer enables the consumer to read or source data from a producer without causing a change in the coherency state or location of the cache line containing the data, upon completion of the operation. In another embodiment, an in place write update operation initiated by a producer allows the producer to update or write to an address or cache line owned by the consumer, while maintaining the coherency state and address ownership by the consumer upon completion of the operation. The read snapshot and in place write update operations are intended to serve as fundamental building blocks in the underlying interconnect and to enable a new set of read and write instructions. In one embodiment, I/O interface blocks, or I/O devices utilizing the I/O interface blocks, may trigger these operations directly to perform I/O to core data transfers. In another embodiment, cores may execute instructions, such as MOVGET and MOVPUT, to trigger these operations to read and write data.

FIG. 1 is a block diagram illustrating an overview of some of the transactions that may be accomplished by embodiments of the present invention. An exemplary system platform 100 may include one or more processors (e.g., processor 110) and one or more I/O interface blocks (e.g., 130). Processor 110, as illustrated, includes two cores, 120-1 and 120-2, each of which includes one or more local caches such as respective level 1 (L1) caches (121-1 and 121-2) and respective level 2 (L2) caches (122-1 and 122-2). Processor 110 may also include a level 3 (L3) cache 123 shared by both the cores 120-1 and 120-2. The I/O interface block 130 may also include one or more local caches (e.g., local cache 132). One or more I/O devices 134 are connected to the I/O interface block 130.

According to embodiments of the present invention, core 1 120-1, as a producer, may update, in place, a cache line that is currently residing in the local cache (e.g., L1 cache 121-2 or L2 cache 122-2) of a consumer core (e.g., core 2 120-2) by executing a MOVPUT instruction 112, without changing the coherency state of the updated cache line and its location in the cache hierarchy. In one embodiment, the execution of the MOVPUT instruction triggers an in place write update operation. In addition, core 1 120-1, as a consumer, may read a cache line currently residing in the local cache (e.g., L1 cache 121-2 or L2 cache 122-2) of a producer core (e.g., core 2 120-2) without changing the coherency state of the cache line and its location in the cache hierarchy, by executing a MOVGET instruction 114.

According to an embodiment, the execution of the MOVGET instruction by core 1 120-1 triggers a read snapshot operation.

Similarly, the I/O interface block 130, as a producer, may update in place a line that is currently residing in a processor's local cache (e.g., L1 cache 121-1, L2 cache 122-2, or shared L3 cache 123) using the in place write update operation, without changing the coherency state of the updated cache line or its position in the cache hierarchy. On the flip side, I/O interface block 130 may also read a cache line that is currently residing in a processor's local cache (e.g., L1 cache 121-2, L2 cache 122-2, or shared L3 cache 123) without changing the cache line's coherency state or place in the cache hierarchy, by using the read snapshot operation.

Read Snapshot/MOVGET

The read snapshot operation is used in producer consumer usage models wherein the consumer is sourcing data from the producer and storing it into a memory location local to the consumer, without disturbing the source address or cache line containing the data. In one embodiment, the memory location local to the consumer is a register used by the consumer. In other embodiments, the local memory location is a memory address or cache line in the consumer's local cache that is different from the source memory address or cache line. In yet another embodiment, the local memory location is a data buffer, such as one residing in the consumer's local cache and may be used repeatedly by the producer to update with new data for the consumer. The read snapshot operation may source data for a memory address wherever that data exists, without changing the data's existing coherency state or the its location in the caching hierarchy. For example, if the most current (i.e., modified) data being requested for a memory address happens to be cached in a cache line of the L1 cache, the read snapshot operation would read the data from the cache line in the L1 cache and provide it to the consumer requesting the data. In contrast to current approaches, such as using a regular read or load operation, which tend to force any modified (i.e., dirty) data to be written back to memory, at the completion of a read snapshot operation, the requested data will continue to reside in the cache line in the L1 cache. The read snapshot operation does not cause a change to the cache line's location or coherency state as a consequence of carrying out the operation.

To trigger the read snapshot operation between processor cores, according to an embodiment, a new load instruction, MOVGET is added to the instruction set architecture (ISA). The MOVGET instruction utilizes the underlying read snapshot operation to provide more efficient data movement operations between processor cores. A processor core executing the MOVGET instruction will simply "get" a current copy of the requested cache line (i.e., data) without having to load the cache line into its local cache or altering the location, and/or coherency state of the requested cache line.

Figure 2A:
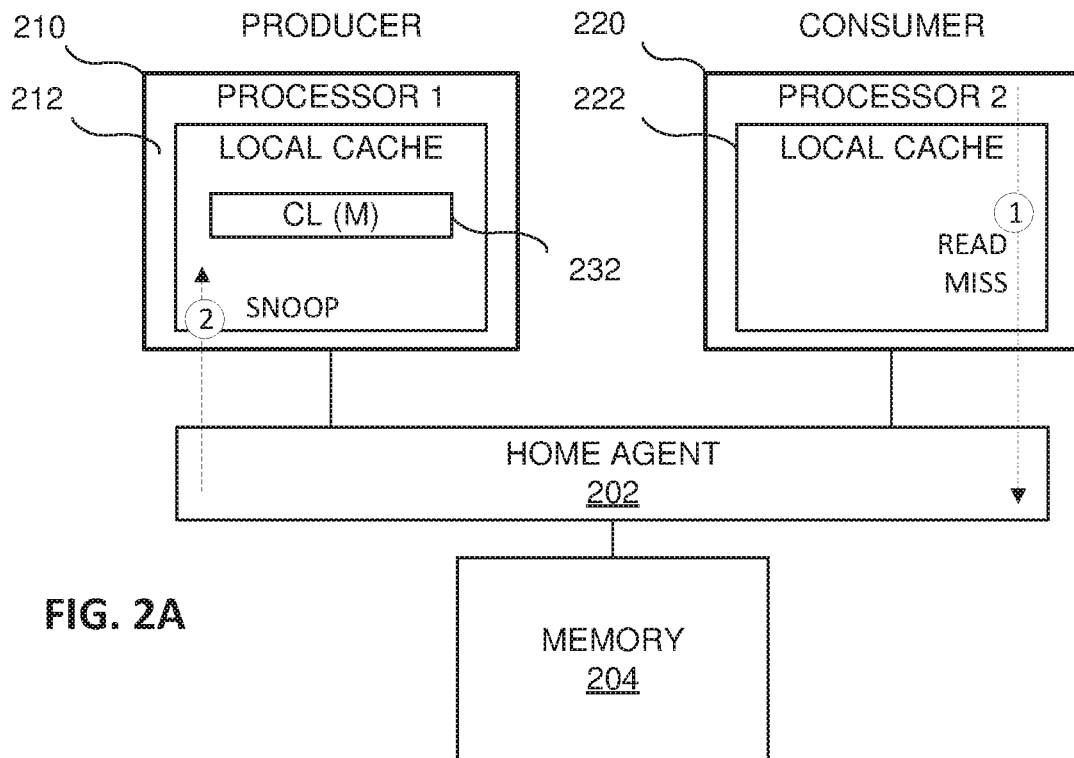
FIGS. 2A-2B illustrate the underlying interactions in a typical producer/consumer data exchange between two processors using a read/load instruction.
Figure 2B:
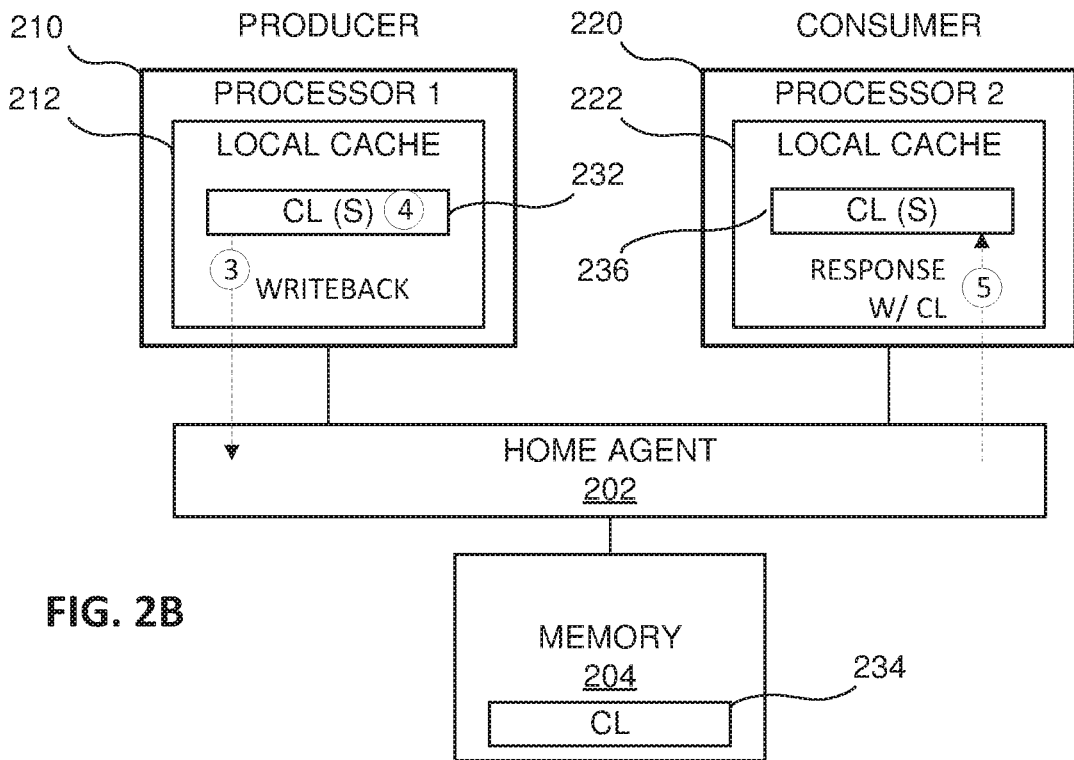
Figure 3A:
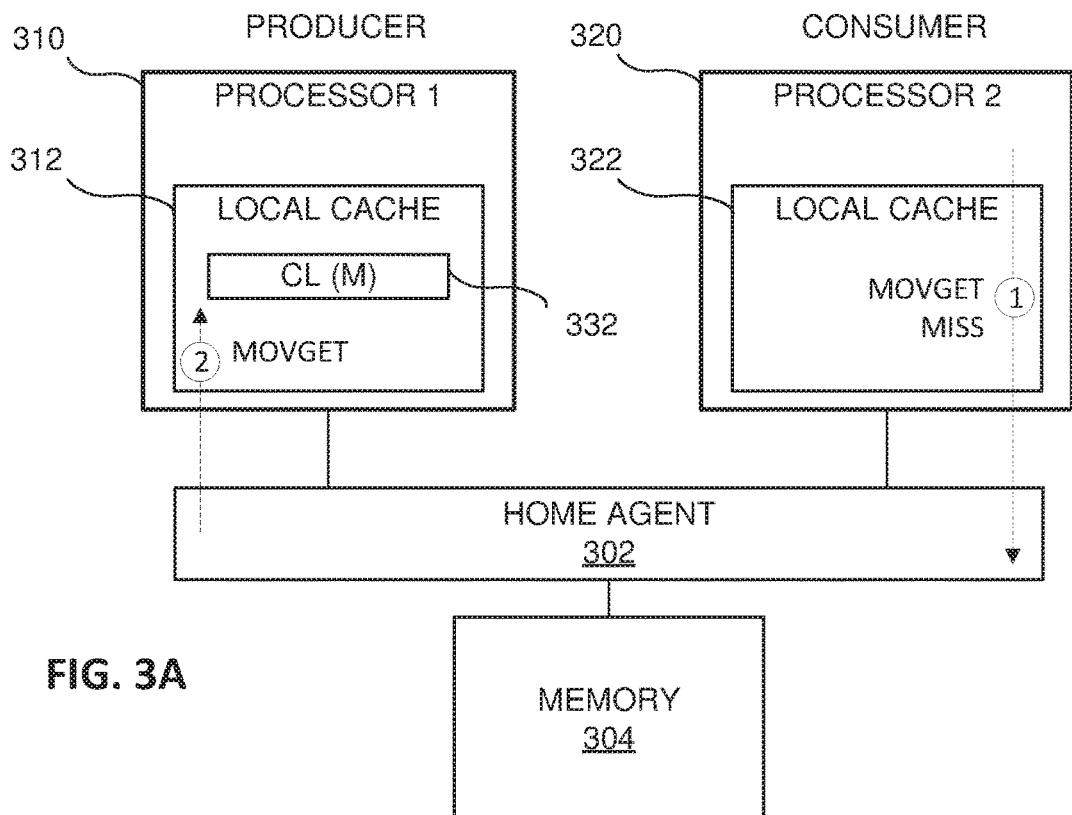
FIGS. 3A-3B illustrate the underlying interactions in a producer/consumer data exchange between two processors when a MOVGET instruction is used in accordance to an embodiment.
Figure 3B:
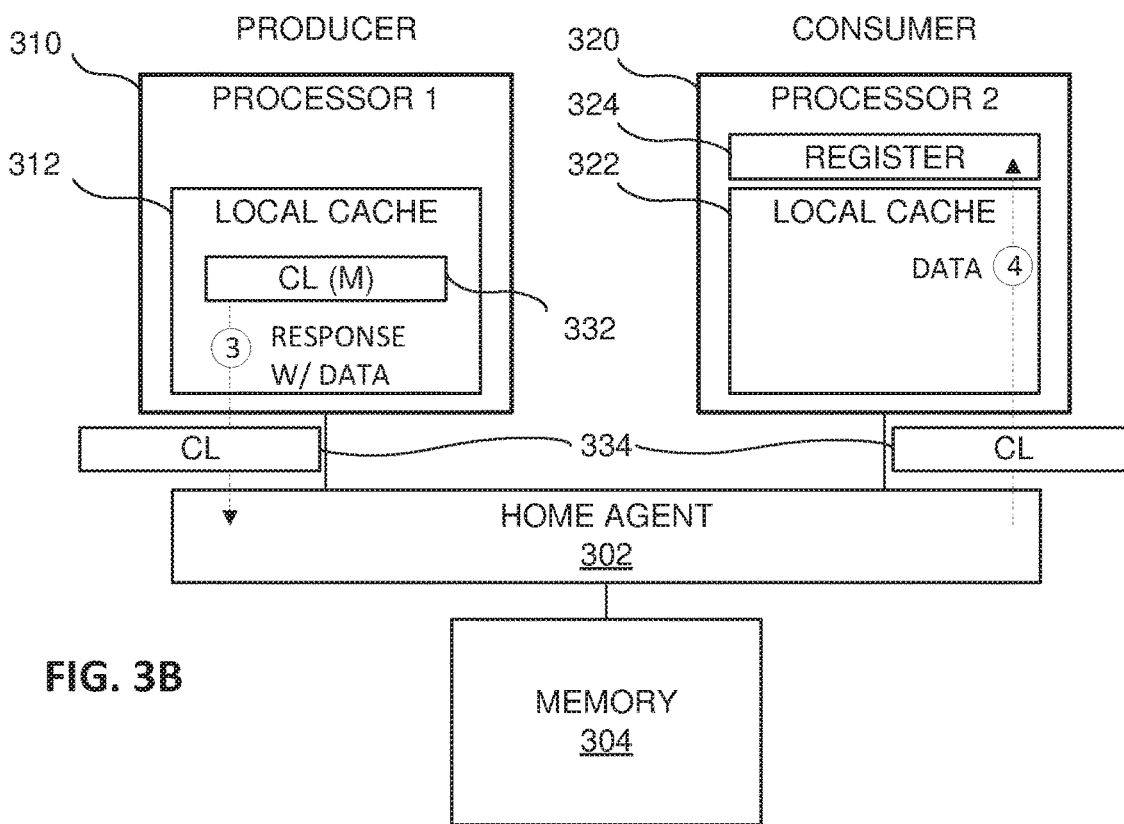

FIGS. 2A and 2B illustrate the underlying interactions in a typical producer/consumer data exchange between two processors using a read/load instruction whereas FIGS. 3A and 3B, in contrast, illustrate the underlying interactions when a MOVGET instruction is used in accordance to an embodiment. The producer and consumer shown in these figures may be logical processors, threads, or cores in a multi-threaded/multi-core processor. Moreover, while for simplicity, a single local cache is illustrated for each producer and consumer, they may include additional levels of local caches and some of which may be shared.

In FIG. 2A, Processor 2 320 (i.e., the consumer) seeks to read cache line (CL) 232. However, the only valid instance of cache line 232, which may be in modified (M) or exclusive (E) state, resides in the local cache 212 of processor 1 210 (i.e., the producer). As such, the read by processor 2 220 misses its local cache 222. This is illustrated by operation 1 (i.e., 1 enclosed by circle). As a result of this miss, the home agent 202 issues a snoop request for cache line 232 to processor 1 210, as illustrated by operation 2. The "home agent" used here and throughout this disclosure refers to any controller, agent, module, circuitry, or program code, etc. that performs, among other things, functions to enforce and/or ensure memory/cache coherence. It may also be known or referred to as a coherency agent or coherency controller. According to an embodiment, the home agent is a global coherence manager that manages coherence between other coherency agents or controllers. Home agent 202 may include or have access to a directory that tracks ownership and/or status of each cache line. Next, as illustrated by FIG. 2B, if cache line 232 in the local cache 212 of processor 1 210 is in modified (M) state and thus "dirty," cache line 232 is written back to memory 204 as cache line 234 via a writeback (i.e., operation 3). Additionally, the coherency state of cache line 232 in local cache 212 of processor 1 210 is changed from modified (M) to shared (S), as illustrated by operation 4. If the state of the requested cache line 232 was exclusive (E) instead of modified (M), no writeback required. Rather, the coherency state of the requested cache line 232 is simply changed from exclusive (E) to shared (S).

In either scenario, a copy of cache line 232 is provided to processor 2 220 in operation 5, via a response to processor 2's read miss. This copy of cache line 232 is saved into the local cache 222 as cache line copy 236 and marked as (S)hared. In summary, as a result of the read issued by processor 2 220, the cache coherency state of cache line 232 is changed (e.g., M→S) and a copy of the cache line 236 is cached into the consumer's local cache 222.

In contrast, FIGS. 3A and 3B illustrate the underlying interactions when a MOVGET instruction is used in accordance to embodiments of the current invention. Similar to FIG. 2A, FIG. 3A illustrates processor 2 320 seeking to read cache line 332 which is currently residing in local cache 312 of processor 1 310. However, instead of a typically read, processor 2 320 executes a MOVGET instruction which, in some embodiments, triggers a read snapshot operation in the underlying system platform.

Similar to FIG. 2A, the only valid copy of cache line 332, which may be in modified (M) or exclusive state (E), resides in processor 1 310. The MOVGET operation issued by processor 2 320 to request cache line 302, therefore, results in a miss in its local cache 322, as illustrated by operation 1. Subsequent to the miss, home agent 302 forwards the request or issues a snoop to processor 1 310. In some embodiments, the request or snoop to processor 1 310 includes a hint indicating that only the data from the cache line is requested. Next, as shown in FIG. 3B, in response to processing the request, processor 1 310 sends cache line copy (i.e., data) 334 to the home agent 302 in operation 3. The home agent 302, in turn, sends the cache line copy (i.e., data) 334 to processor 2 320 in operation 4. Alternatively, cache line copy (i.e., data) may be sent directly from processor 1 to processor 2 without going through home agent 302. According to some embodiments, the cache line copy (i.e., data) 334 is not cached in processor 2's local cache 322. Instead, it is stored directly into a register 324. In other embodiments, the cache line copy (i.e., data) 334 may be saved into processor 2's local cache 322 at a different address or cache line (not shown). No change is made to the original cache line 332 which still resides in the local cache 312 of processor 1 310 and maintains its cache coherency state (e.g., modified (M) or exclusive (E)).

It should be appreciated that cache line 332 need not be in modified (M) or exclusive (E) state for MOVGET operation to work. In situations where cache line 332 is cached in multiple caches or processors (i.e., coherency state is shared (S)), a processor issuing a MOVGET operation, according to an embodiment, would still receive a copy of cache line 332 from at least one of the multiple caches or processors that owns a copy of the cache line. Those copies would remain in the shared (S) state after the access.

Figure 4A:
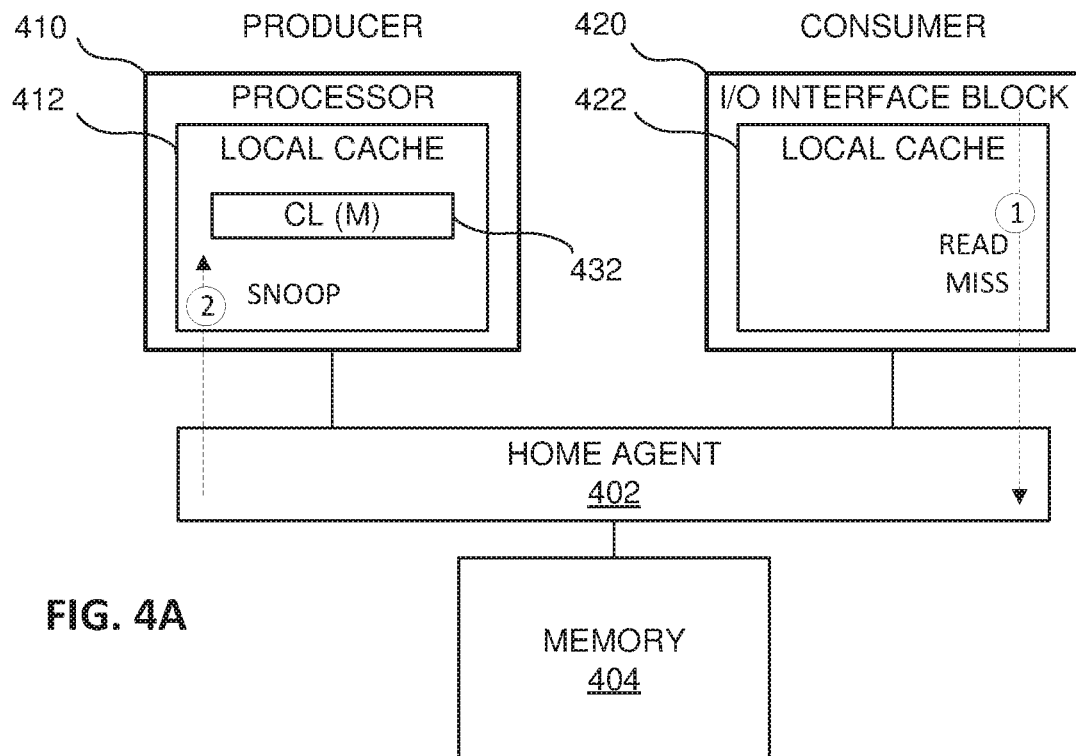
FIGS. 4A-4B illustrate the underlying interactions in a typical producer/consumer data exchange between a processor and an input-output (I/O) interface block using a read/load instruction.
Figure 4B:
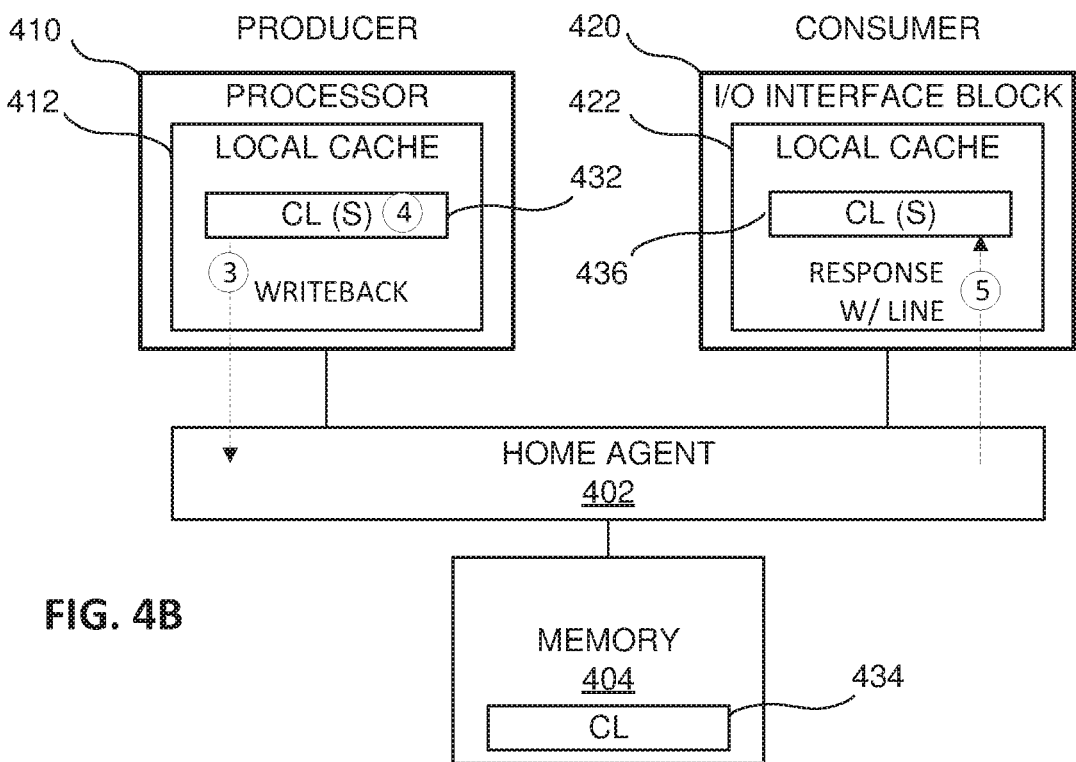

While in FIGS. 2A-2B and 3A-3B illustrated the interaction between two processors or processor cores, similar interactions can be found in scenarios involving other nodes or devices participating in memory/cache coherence. For example, FIGS. 4A-4B and 5A-5B illustrate similar producer/consumer data exchanges between a processor and an I/O interface block. In FIGS. 4A-4B, a read operation is used while in FIGS. 5A-5B, a read snapshot operation is used.

Referring to FIG. 4A, I/O interface block 420 (i.e., the consumer) seeks to read cache line (CL) 432. However, the only valid instance of cache line 432 resides in the local cache 412 of processor 1 410 (i.e., the producer). As such, the read operation initiated by I/O interface block 420 misses its local cache 422 in operation 1. As a result of this miss, the home agent 402 issues a snoop request for cache line 432 to processor 410, as illustrated by operation 2. Next, since the cache line 432 in the local cache 412 of processor 410 has been modified and therefore "dirty," cache line 432 is written back to memory 404 as cache line 434 via a writeback, as illustrated by operation 3 in FIG. 4B. The coherency state of the original cache line 432 stored in the local cache 412 of processor 410 is changed from modified (M) to shared (S), as illustrated by operation 4. In addition to the writeback to memory, a copy of cache line 432 is provided to the I/O interface block 420 via operation 5. This copy of cache line 432 is saved into the local cache 422 as cache line copy 436 and marked as shared (S). Thus, as a result of the read issued by the I/O interface block 420, the cache coherency state of cache line 432 in processor 410 is altered (i.e. M→S).

Figure 5A:
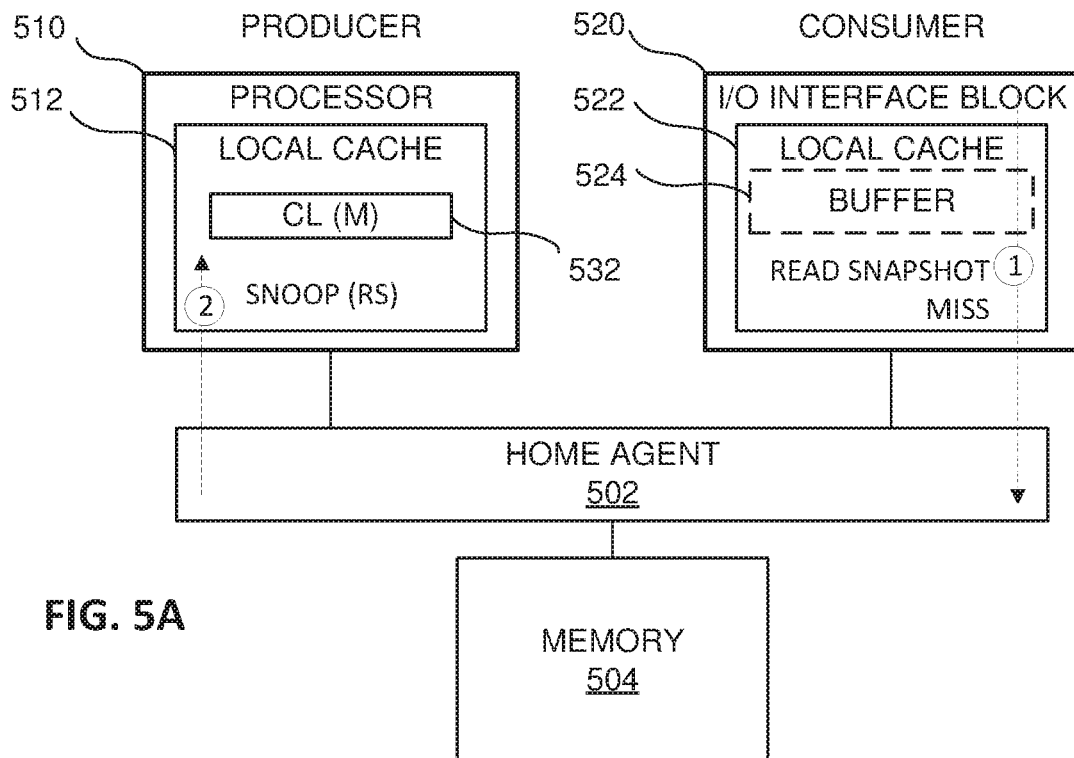
FIGS. 5A-5B illustrate the underlying interactions in a producer/consumer data exchange between two processors when a read snapshot operation is used in accordance to an embodiment.
Figure 5B:
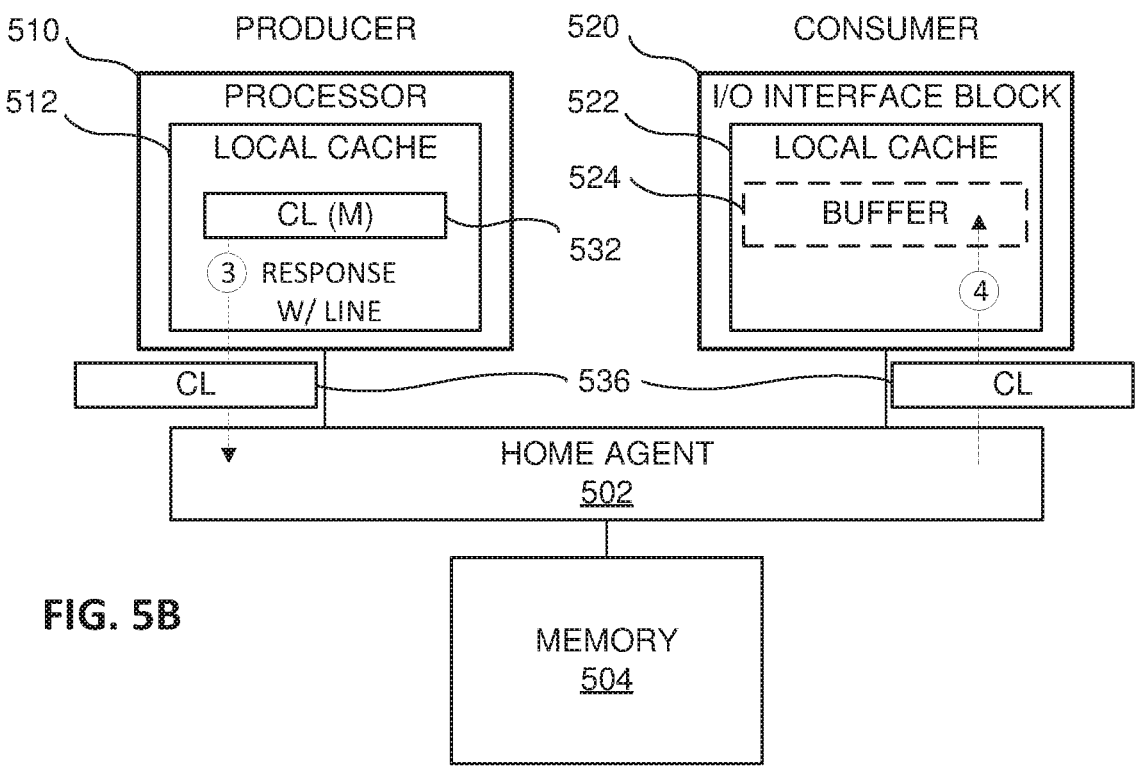

In contrast, FIGS. 5A and 5B illustrate the underlying interactions when the read snapshot operation is used in accordance to some embodiments. Similar to FIG. 4A, FIG. 5A illustrates I/O interface block 520 (i.e., consumer) seeking to read cache line 532 which is currently residing in local cache 512 of processor 510. However, instead of a typically read operation, I/O interface block 520 initiates a read snapshot operation. Since the only valid copy of cache line 532 resides in processor 510, the read snapshot request misses the local cache 522 of I/O interface block 520. This is illustrated by operation 1. As a result of the miss, home agent 502 issues or forwards the read snapshot request (RS) which is received by processor 510 via a snoop illustrated by operation 2. In FIG. 5B, in response to the read snapshot request, processor 510 returns a copy of cache line 532 in operation 3. According to an embodiment, this cache line copy 536 is stored into buffer 524 located in the local cache 522 of the I/O interface block 520. The cache line copy 536 may be stored into a different address. As a result of performing the read snapshot operation, no change is made to the original cache line 532 which still resides in the local cache 512 of processor 510 and maintains its cache coherency state (i.e., modified (M)).

Figure 6:
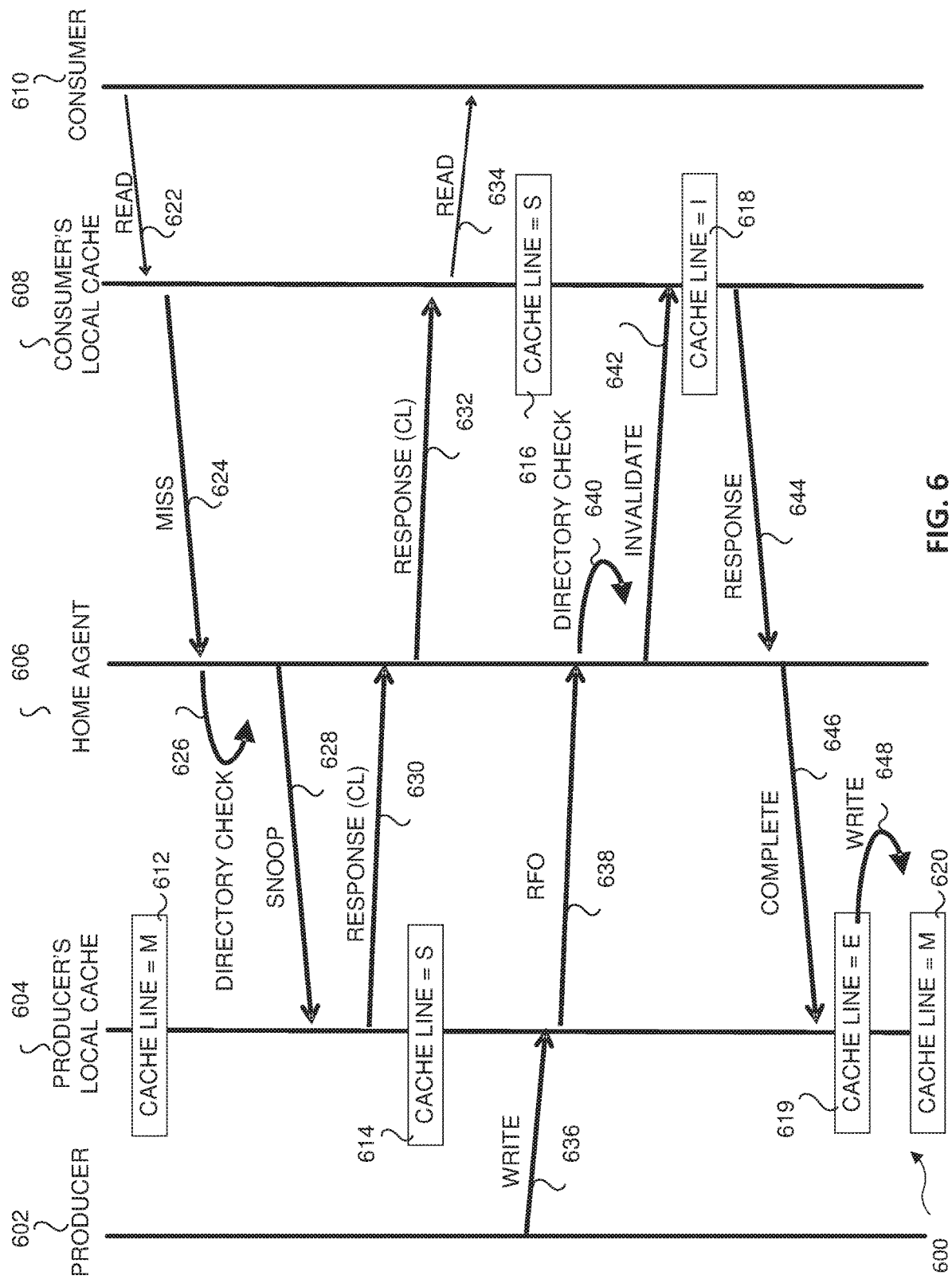
FIG. 6 is a message flow diagram illustrating a consumer accessing a cache line held in the local cache of a producer, and the producer later modifying the same cache line, under a conventional approach.

FIG. 6 is a message flow diagram illustrating a consumer accessing a cache line held in the local cache of a producer and the producer later modifying the same cache line, under a conventional approach. Message flow diagram 600 is implemented on a computer platform comprising a producer 602, a home agent 606, and a consumer 610. The producer and consumer may be any node or entity that participates in a coherent memory hierarchy implemented on the platform. The producer 602 includes a producer's local cache 604 and the consumer 610 includes a consumer's local cache 608. The local cache of the producer and the consumer may include, for instance, L1 cache, L2 cache/mid-level cache (MLC), and/or L3 cache/last-level cache (LLC). Each of the local caches are managed by respective cache agents or controllers (not shown). In some cases, the home agent is a L3/LLC cache agent/controller.

At initial state, there is only one copy of the cache line which is cached in the producer's local cache 604 and has a modified (M) cache coherency state indicating that its "dirty." The initial cache line is illustrated by reference number 612. The consumer 610 desires to obtain a copy of this cache line and therefore issues a read request 622. Since consumer's local cache 608 does not contain a copy of the cache line, the read request results in a miss 624 which is then forwarded to the home agent 606. In response to the read miss 624, the home agent 606 determines at 626, such as checking a directory, which cache has the request cache line. Upon determining that the producer's local cache 604 contains cache line 612, the home agent 606 sends a message 628 to the producer's local cache 604 to request the cache line. In turn, producer's cache 604 sends a response 630 containing a copy of the cache line back to the home agent 606. A copy of the cache line is retained in the producer's cache 604 with its cache coherency state set to shared (S). This is illustrated by reference number 614. Responsive to receiving the response 630 from the producer's local cache 604, the home agent 606 writes back the cache line into memory to ensure that any modification made to the cache line is not lost. In addition, the home agent 606 forwards the response along with the requested cache line to the consumer's local cache 608 via response 632. The requested cache line is then saved in the consumer's local cache 608 as cache line copy 616 and marked as shared (S).

Thereafter, the producer 602 seeks to write to the cache line. A write request 636 is sent to the local cache 604 to obtain the cache line. While a copy of the cache line 614 is cached in the producer's local cache 604, its cache coherency state is marked shared (S) state and thus sole ownership of the cache line must first be obtained before it can be modified. Accordingly, the local cache 604 sends a request for ownership (RFO) message to the home agent 606. The home agent 606 again determines at 640 which of the cache(s) also has a copy of the cache line. Upon determining that the consumer's local cache 608 contains a copy of the cache line, the home agent 606 sends message 642 to invalidate the copy of the cache line cached in the consumer's local cache 608, in order to give exclusive ownership of the cache line to the producer 602. Responsive to the invalidate message 642, the cache coherency state of cache line copy 618 in the consumer's local cache 608 is set to (I)nvalidate and a response 644 is dispatched back to the home agent 606 confirming the invalidation. The home agent then sends a message of completion 646 back to the producer's local cache 604 indicating the completion of the RFO request. In response, the cache line copy in the producer's local cache 604 is marked (E)xclusive indicating sole ownership of the cache line by the producer's local cache 604. A write 648 is then performed on the cache line. The updated (i.e., dirty) cache line 620 is then marked as modified (M) state. As illustrated by FIG. 6, this producer/consumer exchange creates a ping-pong effect where the producer loses control of a cache line after a consumer read and is required to re-establish cache line ownership before the producer can modify the cache line again. This ping-pong effect is time-consuming and should be avoided.

Figure 7:
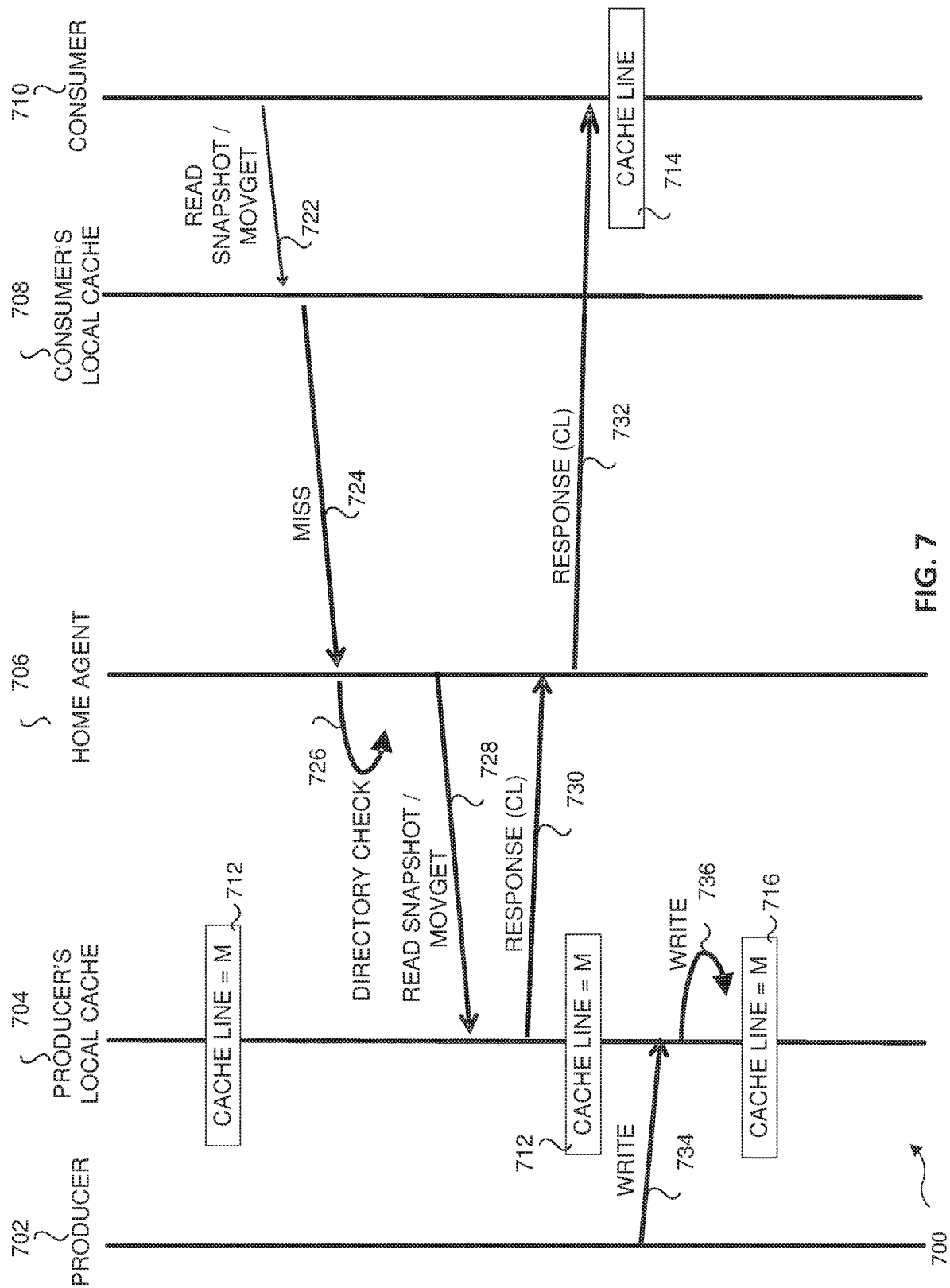
FIG. 7 is a message flow diagram illustrating a consumer accessing a cache line held in the local cache of a producer, and the producer later modifying the same cache line, in accordance to embodiments of the present invention.

FIG. 7 is a message flow diagram illustrating a cache line access between a producer and a consumer under which a read snapshot operation, or a MOVGET instruction that triggers the read snapshot operation, is used, according to embodiments of the present invention. At initial state, similar to FIG. 6, there is only one valid instance of the cache line which is cached in the producer's local cache 704. This cache line is marked modified (M) indicating that it is "dirty." The initial cache line is as illustrated by reference number 712. The consumer 710 desires to obtain a copy of this cache line. However, instead of a read operation, consumer 710 uses a read snapshot operation 722. In some embodiments, the consumer 7 executes a MOVGET instruction to trigger the read snapshot operation in the underlying system platform. Since consumer's local cache 708 does not contain a copy of the cache line, the read snapshot request results in a miss 724 which is then forwarded to the home agent 706. In response to the read miss 724, the home agent 706 determines at 726 (e.g., checking a directory) which cache(s) has the requested cache line. Upon determining that the producer's cache 704 contains cache line 712, the home agent 706 forwards the read snapshot/MOVGET request 728 to the producer's local cache 704 for the cache line. In turn, producer's local cache 704 sends a response 730 containing a copy of the cache line back to the home agent 706. The original cache line 712 remains unchanged and is retained in the same location in the producer's cache 704. Responsive to receiving the response 730 from the producer's local cache 704, the home agent 706 forwards the response along with the copy of the cache line to the consumer's local cache 708 via response message 732. The cache line copy 714 is then provided to the consumer 710. In one embodiment, the cache line copy 714 is saved to a register in the consumer 710 and not into the local cache 708. In other embodiments, the data in cache line copy 714 is saved to a different address in the local cache 708, such as saving it as a new cache line with the appropriate coherency state.

Thereafter, the producer 702 seeks to write to the cache line by issuing a write operation. A write request 734 is sent to the producer's local cache 704. The requested cache line 712 is found in the local cache 704 with a (M)odified state, indicating that that the cache line 712 is already the most recent valid copy. As such, data is written directly to the cache line 712 via write 736. The updated cache line 716 stays in the same local cache 704 and retains the (M)odified coherency state.

Compared to the conventional approach illustrated in FIG. 6, the new approach in FIG. 7 eliminates the ping-pong effect in the contention for cache line ownership between a producer and consumer, thus saving processing time, as well as associated resources and messaging overheads.

The following pseudocode illustrate the usage of an embodiment of the MOVGET instruction in comparison with the usage of a conventional READ instruction:

```
flag = 0 // initializes flag
//PRODUCER loop
while (flag != 0) { }                            // wait for flag to be cleared by CONSUMER.
memcpy (prodbuf, databuf, datalen);              // PRODUCER writes from databuf to prodbuf.
atomic_update(flag = datalen);                   // set flag to let CONSUMER read.
...
//CONSUMER loop using MOVGET
while (flag == 0) { }                            // wait for flag to be set by PRODUCER.
memcpy_using_movget(consbuf, prodbuf, flag);     // CONSUMER uses MOVGET to copy
                                                 // from prodbuf to consbuf.
atomic_update(flag = 0);                         // clear flag to let PRODUCER write.
...
//CONSUMER loop using conventional READ
while (flag == 0) { }                            // wait for flag to be set by PRODUCER.
memcpy(consbuf, prodbuf, flag);                  // CONSUMER uses traditional load to copy
                                                 // from prodbuf to consbuf.
atomic_update(flag = 0);                         // clear flag to let PRODUCER write.
...
```

Figure 8:
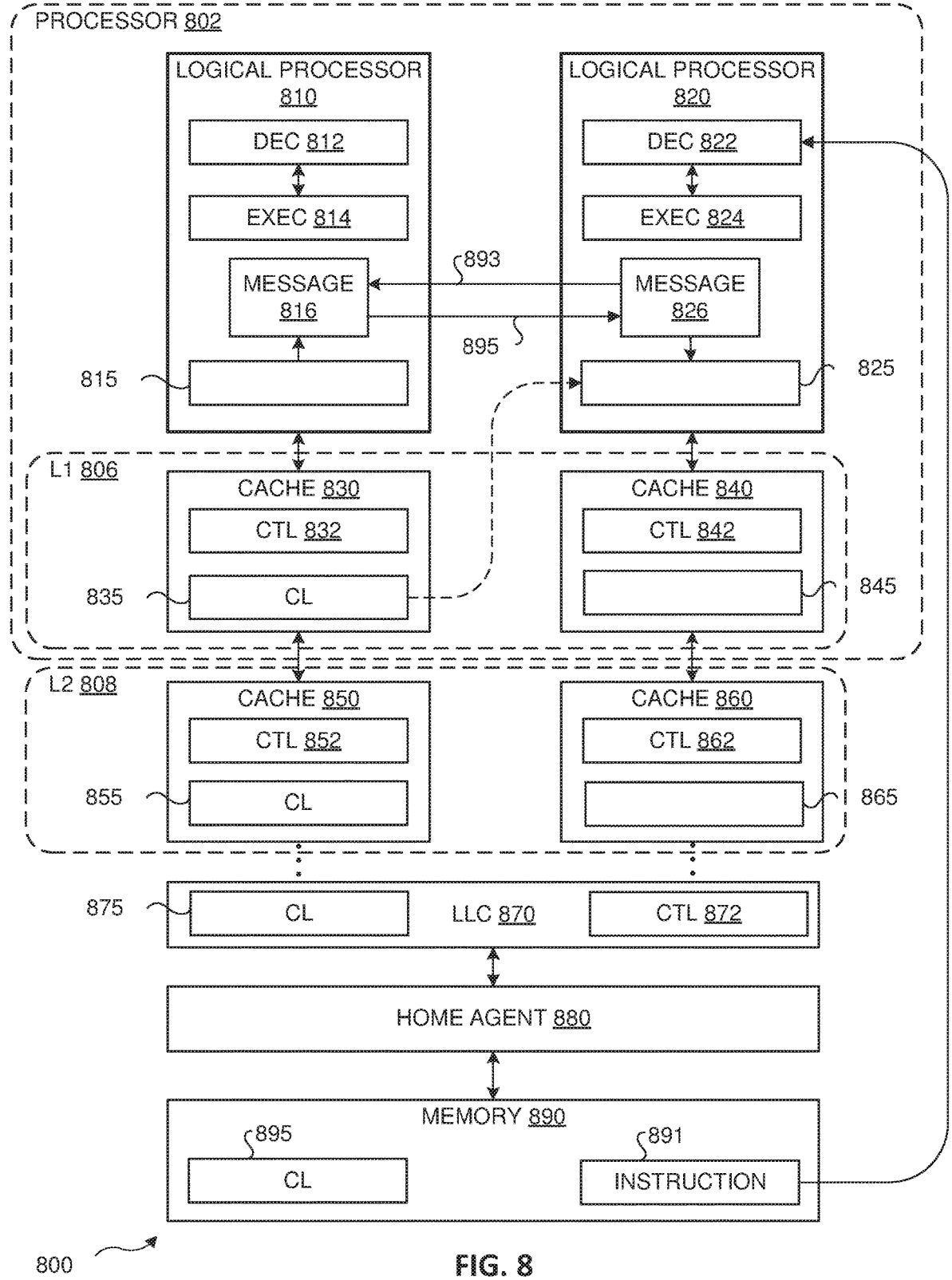
FIG. 8 illustrates a block diagram for an embodiment of a system for using an instruction to provide read snapshot functionality.

FIG. 8 illustrates a block diagram for an embodiment of a system 800 for using an instruction (i.e., MOVGET) to provide read snapshot functionality. System 800 includes home agent 880, system memory 890 and a processor 802. Processor 802 comprises a first logical processor (e.g., hardware thread or processor core) 810 and a second logical processor 820. It will be appreciated that while processor 802 is illustrated, for simplicity, as comprising two logical processors each representing a single hardware thread, the invention is not so limited. For example, it is typical for processors such as processor 802, or other processors illustrated herein, to have several logical processors, which may or may not share some physical resources and or circuitry. Each logical processor may have a plurality of hardware threads capable of simultaneously or concurrently executing software threads. Logical processor 810 has a decode stage or circuitry 812 and one or more execution units or circuitries, e.g. execution unit 814. Logical processor 820 has a decode stage or circuitry 822 and one or more execution units or circuitries, e.g. execution unit 824. Logical processors 810 and 820 each have one or more caches in a cache hierarchy to store cache coherent data in cache lines. For example, logical processor 810 has caches 830 and 850 and logical processor 820 has caches 840 and 860. Caches 830 and 840 are level 1 (L1) caches 806 and include controllers 832 and 842, respectively. Caches 850 and 860 are level 2 (L2) caches 808 and include controllers 852 and 862, respectively. System 800 further includes in its cache memory hierarchy a last level cache 870 that includes controller 872. The last level cache 870 may be inclusive or exclusive of the L1 caches 806 and/or of the L2 caches 808. It will be appreciated that while processor 802 is illustrated, for simplicity, to include only L1 caches 806, other levels of the cache memory hierarchy, such as L2 caches 808, could also be included in processor 802.

Logical processor 810 stores cache coherent data in a cache line 835 for a shared memory address accessible by logical processors 810 and 820. The cache line 835 includes or is associated with a cache coherency state which, in some embodiments, is used by the home agent 880 and/or the various controllers (e.g., 832) to ensure or enforce cache coherence. In some embodiments, the cache coherency state of cache line 835 is set to modified (M) or exclusive (E) state, indicating that cache 830 has sole ownership of cache line 835. By extension, logical producer 810, which includes cache 830, also has sole ownership of cache line 835. Alternatively, cache coherent data may be stored in cache line 855, 875, or 895 in their respective storage locations (e.g., L2 cache 850, LLC 870, or system memory 890), with an associated coherency state indicating their respective storage locations has sole ownership of the cache line.

The decode stage 822 of logical processor 820 is to decode an instruction 891 (e.g., MOVGET) for execution. Instruction 891 may specify a source data operand (e.g. 835 or optionally 855, 875, 895, or some other source data operand). The source data operand in some embodiments is a memory address (e.g. the shared address identifying cache line 835). The instruction 891 may also specifies a destination operand indicating a memory location, which may be a register/buffer (e.g., 825), or a memory address (e.g., 845) that is different from the shared memory address. Moreover, the source and/or the destination operand may specify or indicate a data size, such as 4, 8, 16, 32, or 64-bytes, etc. The size of the operands may vary.

The one or more execution units of logical processor 820 (e.g. execution unit 824), responsive to the decoded instruction 891, may cause data from the source data operand (e.g., cache line 835 or optionally 855, 875, 895 or some other source data operand) to be copied to the memory location specified by the destination operand (e.g., 825 or 845), without changing the data, cache coherency state, and/or location of the source data operand. The copying of the data, according to some embodiments, are performed by utilizing the home agent 880 and/or the various cache controllers (e.g., 830). Embodiments of instruction 891 provide a read snapshot functionality, which permits logical processor 820 to read data from a source data operand (e.g., cache line 835) while leaving sole ownership of the cache coherent data in the storage location (e.g., cache 830) of source data operand (e.g., cache line 835), so as to avoid incurring a cache miss upon a subsequent write to the source data operand, such as by logical processor 810.

For some embodiments instruction 891 (e.g., MOVGET) may be decoded into one or more operations (e.g., read snapshot operation 893), also known as micro-operations, micro-ops, or uops, which may be sent from message logic 826 of processor core 820 to the messaging logic 816 of processor core 810. In some embodiments, responsive to the read snapshot operation 893, data may be loaded from the source data operand (e.g., 835 or 855 or some other source data operand) into a data buffer (e.g., 815) utilizing cache control logic (e.g., control logic 832 or 852). A message 895 with data may be then sent from messaging logic 816 to messaging logic 826 and the data may be stored into the destination operand 825.

Figure 9:
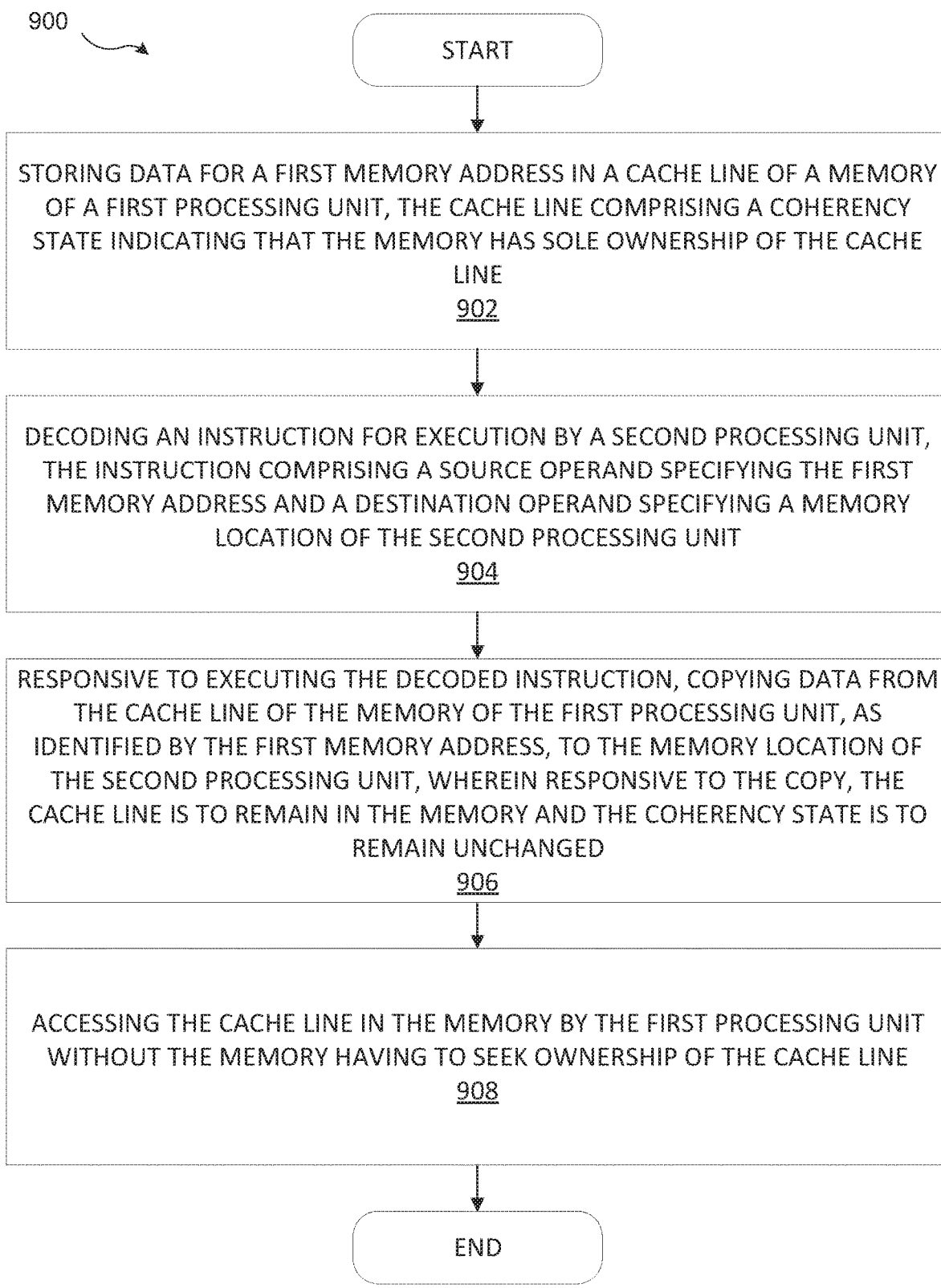
FIG. 9 is a flow diagram illustrating an embodiment of a process to provide read snapshot functionality.

FIG. 9 illustrate a flow diagram for one embodiment of a process 900 to provide read snapshot functionality. Process 900 and other processes herein disclosed are performed by processing blocks that may comprise dedicated hardware or software or firmware operation codes executable by general machines or by special purpose machines or by a combination of both.

In block 902, data for a first memory address is stored in a cache line of a memory of a first processing unit. The cache line may include or be associated with a coherency state indicating that the memory has sole ownership of the cache line. The coherency state may be a modified (M) or exclusive (E) state. The memory may be a level 1 (L1) cache, level 2 (L2) cache/mid-level cache (MLC), level 3 (L3) cache/last-level cache (LLC), or system memory.

In block 904, a second processing unit decodes an instruction for execution, the instruction comprising a source data operand specifying the first memory address and a destination operand specifying a memory location of the second processing unit. The instruction may be a MOVGET instruction that when decoded and executed, triggers a read snapshot operation. The memory location specified by the destination operand may be a register of the second processing unit. Alternatively, the memory location may be a second memory address that is different from the first memory address. In an embodiment, the first and second memory address may be expressed as an offset to another memory address. Moreover, the source and/or the destination operand may specify or indicate a data size, such as 4, 8, 16, 32, or 64-bytes, etc. The size of the operands may vary.

In block 906, the second processing unit, responsive to executing the decoded instruction, causes data from the cache line of the memory of the first processing unit, as identified by the first memory address, to be copied to the memory location of the second processing unit. As a result of the copy, the cache line is to remain in the memory of the first processing unit and the cache line's coherency state is to remain unchanged.

In block 908, the cache line in the memory of the first processing unit is accessed (e.g., a write to the cache line) without the memory having to seek ownership of the cache line.

In Place Write Update/MOVPUT

The in place write update operation is used in producer-consumer usage models wherein the producer is targeting an address that is, preferably, in the consumer's local cache. In some cases, the targeted address has, either explicitly or implicitly, been "warmed up" by the consumer through repeated use. The producer updates the target address with new data to be consumed by the consumer. The in place write update operation updates the target address wherever the latest data for the targeted address exists and does not change the existing coherency state and/or the location of the target address in the caching hierarchy. For example, if a producer has new data for a target address that is currently in the consumer's L1 cache and in modified (M) state, the in place write update operation would simply update the target address in the consumer's L1 cache with new data. In contrast to current approaches, such as using a regular write operation which requires writing back modified data to memory and invalidating the target address in consumer's L1 cache, at the completion of an in place write update operation, the target address would continue to reside in the consumer's L1 data cache. The in place write update operation does not result in any change in the location or coherency state of the target address.

Figure 10A:
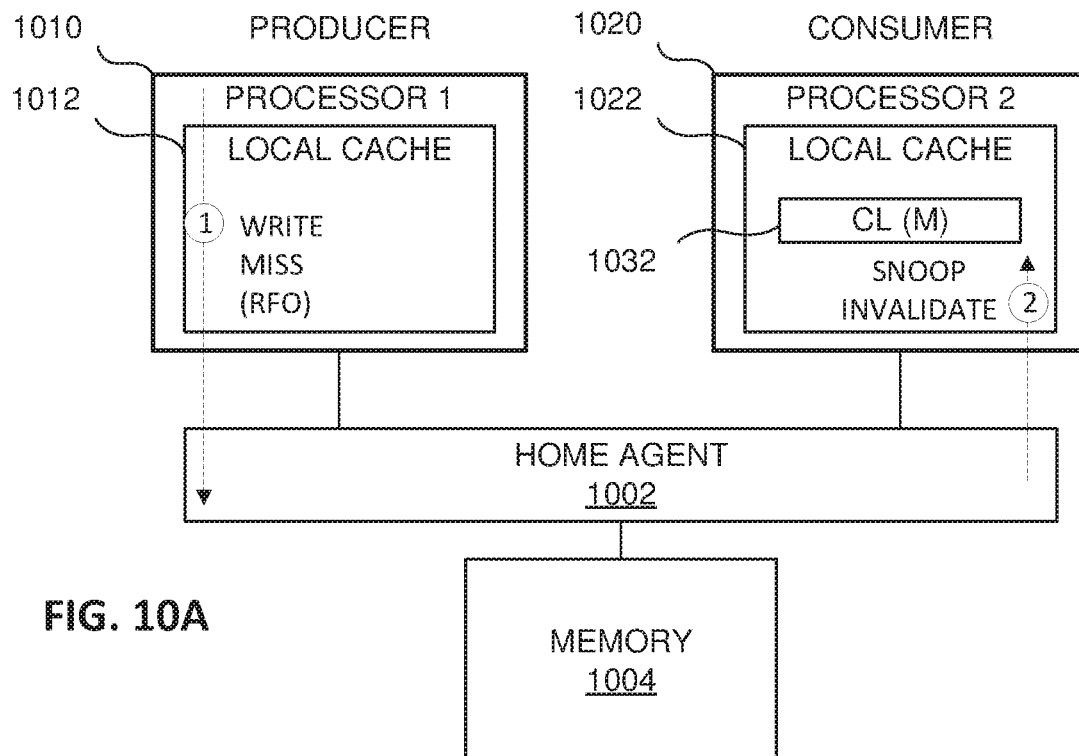
FIGS. 10A-10B illustrate the underlying interactions in a typical producer/consumer data exchange between two processors using a write instruction.
Figure 10B:
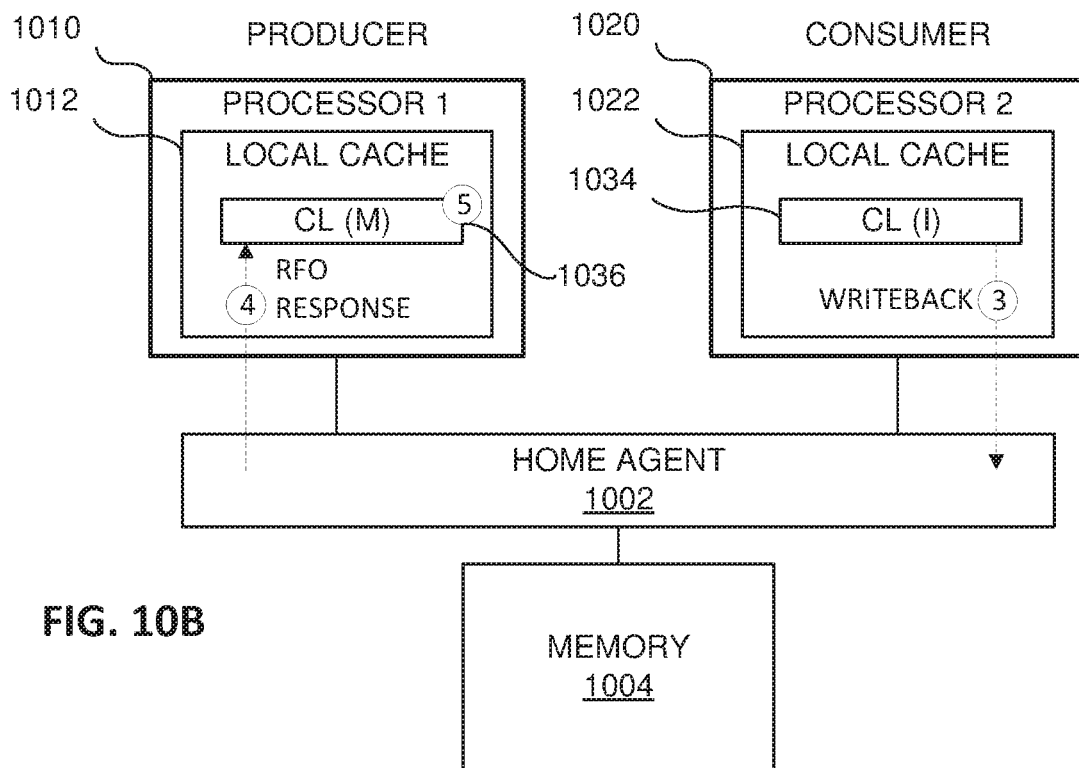

To trigger the in place write update between processor cores, according to an embodiment, a new store instruction, MOVPUT is added to the instruction set architecture (ISA). The MOVPUT instruction utilizes the underlying in place write update operation to provide more efficient data movement operations between processor cores. A processor core executing the MOVPUT instruction will simply "put" (i.e., update) data for a target memory address (i.e., cache line) in-place (i.e., at its current location in the cache hierarchy), without having to load the target memory address (i.e., cache line) into the processor core's local cache or altering its location, and/or its ownership. FIGS. 10A and 10B illustrate the underlying interactions in a typical producer/consumer data exchange using a write instruction whereas FIGS. 11A-11C, in contrast, illustrate the underlying interactions when an embodiment of the MOVPUT instruction is used. The producer and consumer illustrated may be logical processors (threads) or cores in a multi-threaded/multi-core processor. While in these figures, for simplicity, a single local cache is illustrated for each producer and consumer, there may be additional or multiple levels of local caches.

In FIG. 10A, processor 1 1010 (i.e., the producer) seeks to write to target cache line (CL) currently residing in processor 2 1020 (i.e., the consumer). Processor 1's local cache 1012 does not have a valid copy of the target cache line because the only valid instance 1032 is in processor 2's local cache 1022 with a modified (M) state indicating sole ownership by processor 2 1020. As such, the write by processor 1 1010 misses its local cache 1012 and a read for ownership (RFO) message is issued, as illustrated by operation 1. Responsive to the RFO, the home agent 1002 issues an invalidate message to invalidate the target cache line. The invalidate message is received by processor 2's local cache 1022 via a snoop in operation 2. Next, referring to FIG. 10B, the "dirty" target cache line in processor 2's local cache 1022 is written back to memory in operation 3 and the instance of target cache line in local cache 1022 is marked invalidate (I) as shown by 1034. In response to the invalidation, an RFO response message is issued by the home agent to processor 1's local cache 1012. Processor 1 then writes data to the target cache line in the local cache 1012 in operation 5. This cache line 1036 is marked modified (M). Thus, as a result of a write operation issued by processor 1 1012, the coherency state of the target cache line in processor 2's local cache 1022 is changed (e.g., M→I). Ownership of the target cache line is transferred from processor 2 1020 of processor 1 1010 and the target cache line is cached in local cache 1012 as opposed to the original location (i.e., cache 1022).

Figure 11A:
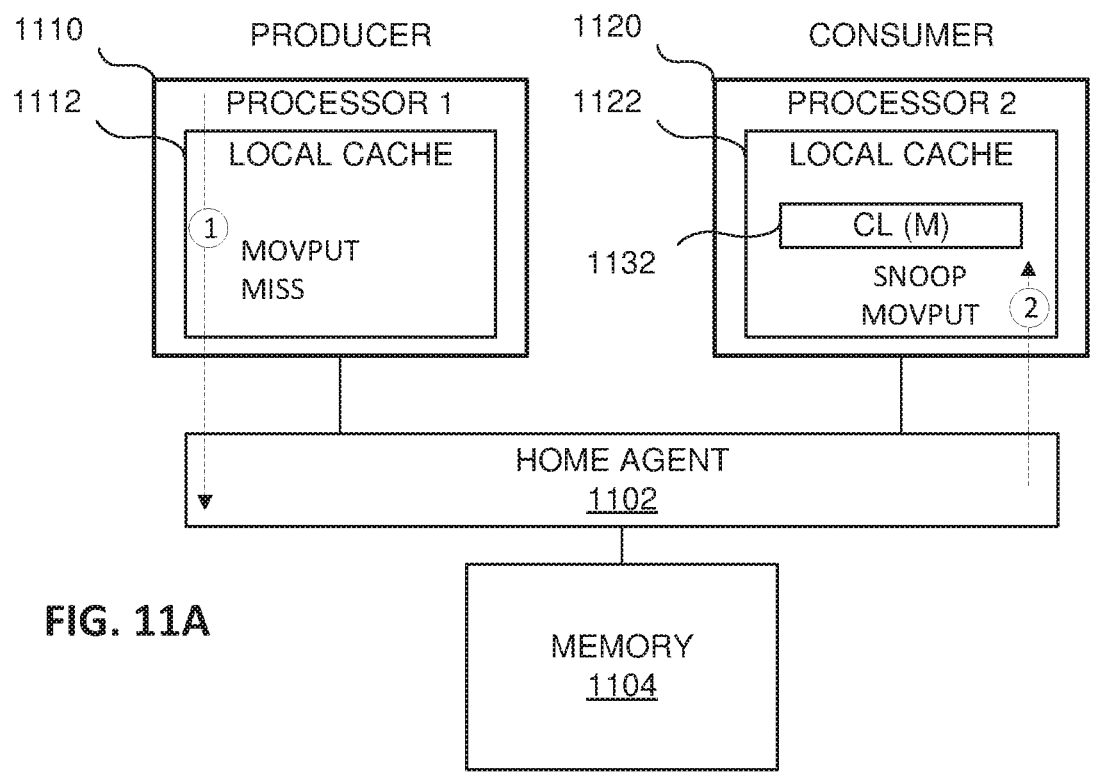
FIGS. 11A-11C illustrate the underlying interactions in a producer/consumer data exchange between two processors when a MOVPUT instruction is used in accordance to an embodiment.
Figure 11B:
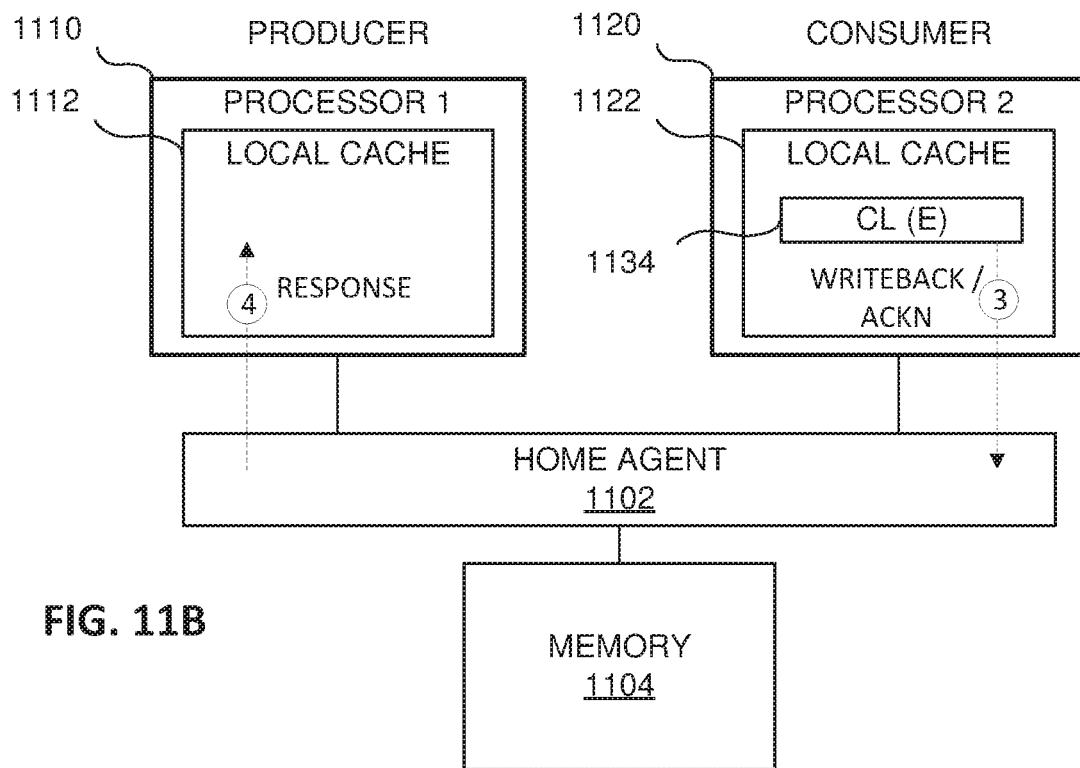
Figure 11C:
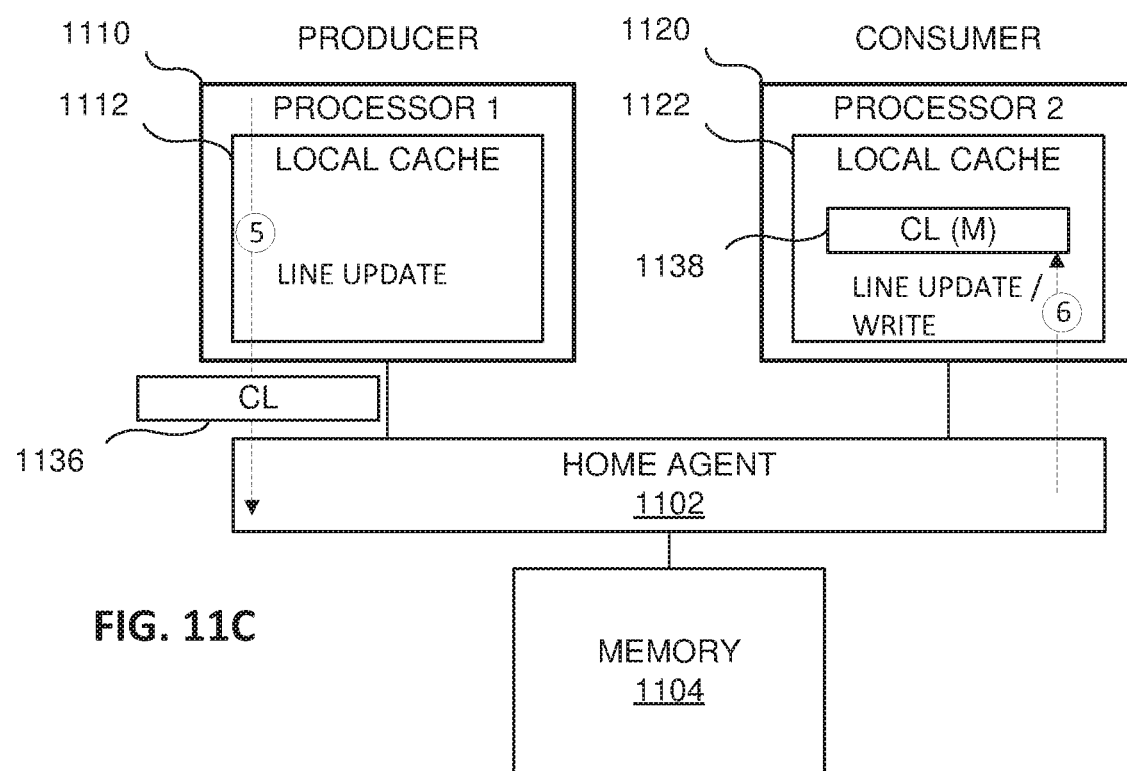

In contrast, FIGS. 11A-11C illustrate the underlying interactions when a MOVPUT instruction is used in accordance to embodiments of the current invention. Like FIG. 10A, FIG. 11A illustrates processor 1 1110 (i.e., the producer) seeking to write to target cache line (CL) currently residing in the processor 2's local cache 1122. However, instead of a typically write operation, processor 1 1110 executes a MOVPUT instruction which, in some embodiments, triggers an in place write update operation in the underlying system platform.

In FIG. 11A, processor 2's local cache 1122 is the sole owner of cache line 1132, which may be in modified (M) or exclusive (E) state. As such, a MOVPUT/in place write update operation issued by processor 1 1110 results in a miss in local cache 1112. A MOVPUT/in place write update message is then issued by local cache 1112 to the home agent 1102, as illustrated by operation 1. In some embodiments, this message includes a hint indicating an intent to perform in-place update or write to the cache line targeted in the message. It may also include the data to be written to the target cache line. Next, a snoop is issued by the home agent 1102 to processor 2's local cache 1122, as illustrated by operation 2. Referring to FIG. 11B, in response to processing the message, according to some embodiments, local cache 1122 may issue a writeback message to home agent 1102 if the target cache line is dirty, to write back the target cache line to memory. This is shown by operation 3. Alternatively, local cache 1122 may simply return an acknowledgement (ACKN) message confirming its ownership of the target cache line without issuing a writeback. If a writeback was issued, the instance of the target cache line in local cache 1122 may be marked exclusive (E), as shown by 1134. If only an acknowledgement was issued, no change is made to the target cache line's coherency state. Responsive to the message from local cache 1132, home agent 1102 writes the dirty cache line into memory 1104 if a writeback was issued. After the writeback is completed, or if one was not necessary, home agent 1102 issues a response message to processor 1 1110, as shown by operation 4. The response may indicate that local cache 1134 has sole ownership of the cache line. Referring to FIG. 11C, Processor 1 1110, in turn, in operation 5, sends data 1136 to processor 2. This may be a line update. The data 1136 is written into processor 2's local cache 1122 in operation 6 and the updated target cache line 1138 is marked as modified (M). According to some embodiments, processor 1's local cache 1112 does not cache or obtain ownership of the target cache line. Instead, at the conclusion of the MOVPUT/in place write update operation, ownership of the target cache line remains with processor 2 1120 and its local cache 1122. In some embodiments, where the data to be written to the target cache line was provided to the home agent 1102 operation 1, the home agent 1102 may update the target cache line directly after operation 3, thereby skipping operation 4 and 5.

Figure 12:
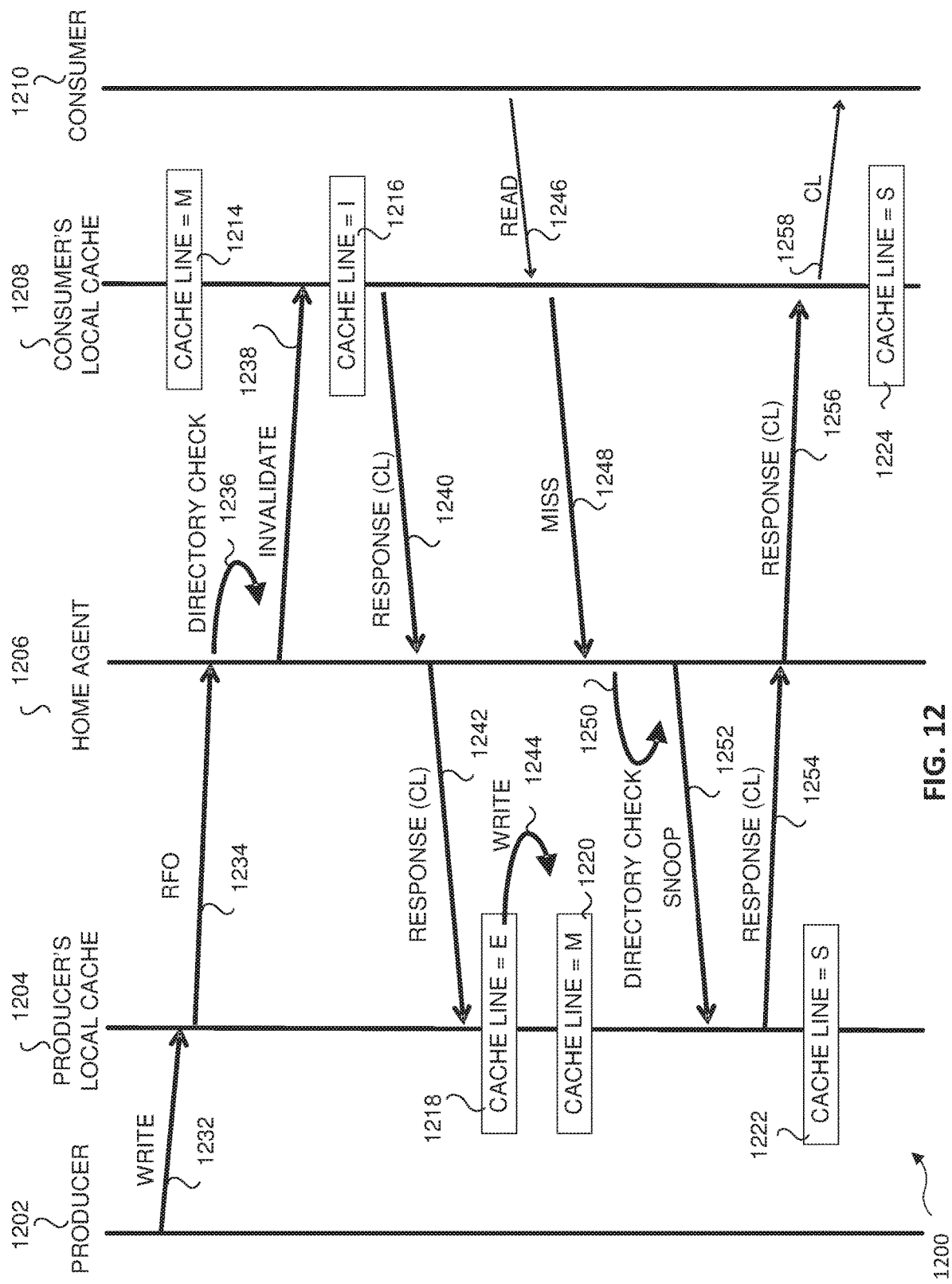
FIG. 12 is a message flow diagram illustrating a producer writing to a target cache line held in the local cache of a consumer, and the consumer later accessing the same cache line, under a conventional approach.

FIG. 12 is a message flow diagram illustrating a producer writing to a target cache line held in the local cache of a consumer, and the consumer later accessing the same cache line, under a conventional approach. Message flow diagram 1200 is implemented on a computer platform comprising a producer 1202, a home agent 1206, and a consumer 1210. The producer and consumer may be any node or entity that participates in a coherent memory implemented on the platform. The producer 1202 includes a producer's local cache 1204 and the consumer 1210 includes a consumer's local cache 1208. The local cache of the producer and the consumer may include, for instance, L1 cache, L2 cache/mid-level cache (MLC), and/or L3 cache/last-level cache (LLC). Each of the local caches are managed by respective cache agents (not shown). In some cases, the home agent is a L3/LLC cache agent.

At initial state, there is only one copy of the target cache line which is cached in the consumer's local cache 1208 and has a modified (M) cache coherency state indicating that it is "dirty." The initial target cache line is illustrated by reference number 1214. The producer 1202 desires to write to this cache line and therefore issues a write request 1202. However, since the producer's local cache 1204 does not contain a valid copy of the target cache line, the read request results in a miss. The producer's local cache 1204 then issues a request for ownership (RFO) 1234. In response to the RFO, home agent 1206 determines (e.g., checking a directory) at 1236 which cache(s) has the requested cache line. Upon determining that the consumer's local cache 1208 contains a valid instance of the target cache line 1214, the home agent 1206 sends message 1238 to the consumer's local cache 1208 to invalidate the target cache line. Since the target cache line 1214 is modified (M) or dirty, a copy of the cache line is sent with a response to the home agent 1206 to be written back to memory and the cache line in the consumer's cache is marked invalid (I) 1216. Upon receiving response 1240, home agent 1206 writes the cache line into memory and sends a message 1242 back to producer's local cache indicating the completion of its RFO request 1234. In some cases, a copy of the cache line marked exclusive (E) 1218 is included with message 1242 and saved into producer's local cache 1204. Responsive to the response message 1242, data is written to cache line 1218 via write 1244. The cache coherency state of the updated cache line 1220 is set to modified (M).

Thereafter, consumer 1210 seeks to read the cache line. A read request 1246 misses consumer's local cache 1208 because its copy of the cache line (i.e., 1216) is no longer valid. A miss message is sent by consumer's local cache 1208 and received by the home agent 1206 to obtain the cache line. Home agent 1206 may determine from a director that producer's local cache 1204 is the exclusive owner of the cache line. A request for the cache line is then sent to and received by the producer's local cache 1204 via a snoop 1252. Responding to the request, the producer's local cache 1204 includes a copy of the request cache line with a response message 1254 back to the home agent. The copy of the cache line 1222 in the producer's local cache is marked as shared (S). Upon receiving the response message 1254, the home agent 1206 writes the included cache line back to memory and issues a response 1256 along with a copy of the requested cache line back to consumer's local cache 1208. In some embodiments, the home agent 1206 also updates the directory with appropriate information. The cache line is then provided to the consumer 1210 by consumer's local cache 1208 via message 1258. A copy of this cache line is stored into the consumer's local cache 1208 and marked as shared (i.e., 1224).

Figure 13:
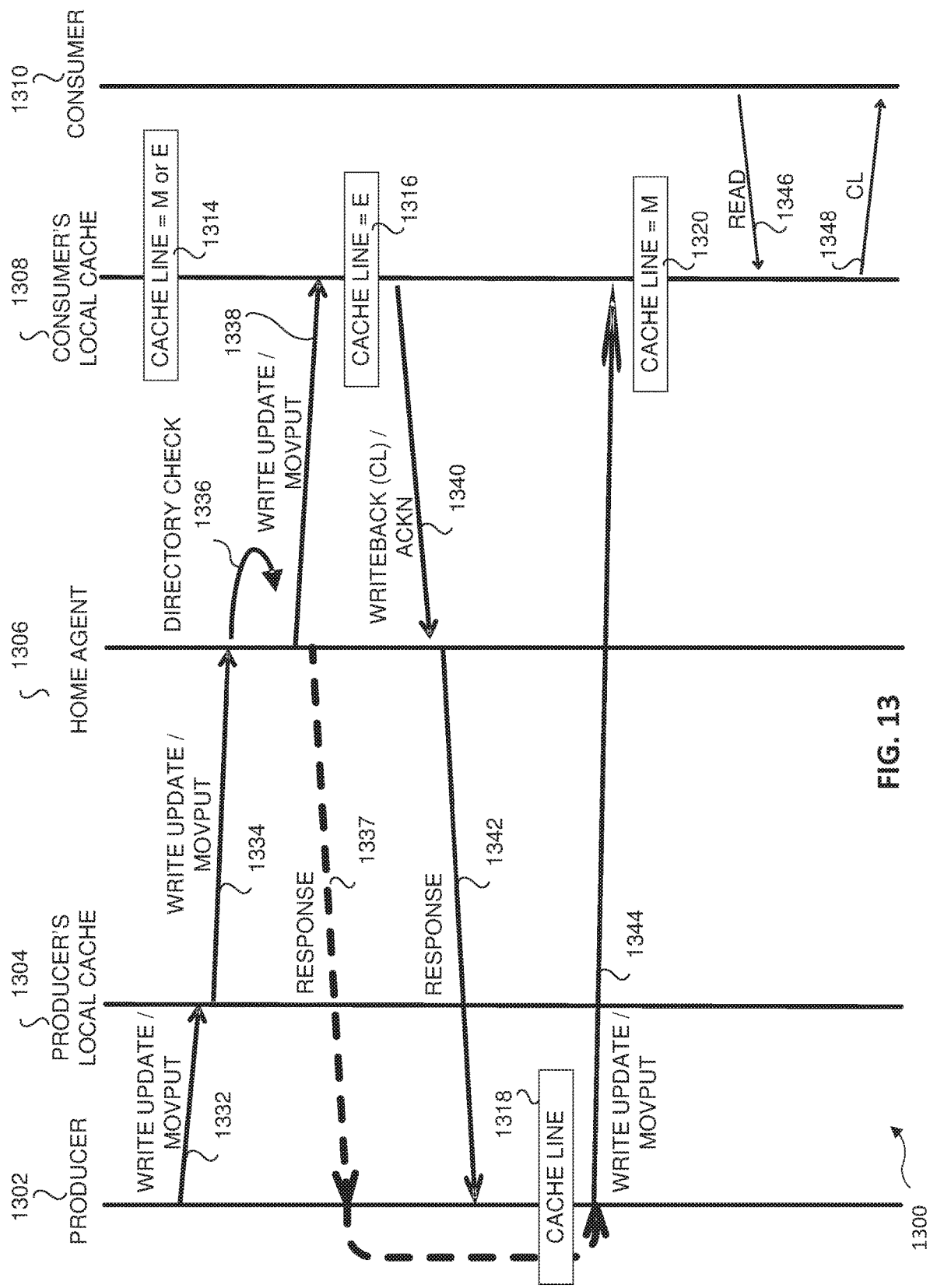
FIG. 13 is a message flow diagram illustrating a producer writing to a target cache line held in the local cache of a consumer, and an embodiment of the present invention utilizing a MOVGET flow to update the target cache line in the consumer cache, which the consumer later accesses.

FIG. 13 is a message flow diagram illustrating a cache line access between a producer and a consumer under which an embodiment of the in place write update operation is used. The in place write update operation may be triggered by the execution of a MOVPUT instruction. At initial state, there is only one valid instance of the target cache line and it is cached in the consumer's local cache 1308. This cache line may be marked modified (M) to indicate that it is "dirty" or alternatively, be marked exclusive (E). The initial cache line is illustrated by reference number 1314. Producer 1302 seeks to write data to the target cache line so that the data may be consumed by a consumer. The producer 1302, however, does not desire or require ownership of the cache line after it has been updated. Thus, instead of using a conventional write operation, producer 1302 initiates an in place write update operation 1332. In some embodiments, the in place write update operation is triggered in the underlying system platform by the producer 1302 executing a MOVPUT instruction.

Because the producer's local cache 1304 does not contain a valid copy of the target cache line, the in place write update operation results in a miss. The producer's local cache 1304 then forwards the request 1334 to the home agent 1306. This request, in some embodiments, may include a hint indicating that the producer intends to update or write in place the target cache line. It may also include the data that the producer 1302 seeks to write to the target cache line. In response to the request, home agent 1306 determines at 1336 (e.g., checking a directory) which cache has a copy of the target cache line. Upon determining that the consumer's local cache 1308 contains the only valid instance of the target cache line 1314, the home agent 1306, according to an embodiment, may return a message 1337 to indicate target cache line ownership by consumer's local cache 1308. In other embodiments, the home agent 1306 forwards the request 1338 to the consumer's local cache 1308 to confirm ownership. Next, in some embodiments, such as ones where the target cache line is dirty (i.e., modified (M)), a copy of the target cache line is returned with a response message 1340 for memory writeback and the target cache line in cache 1308 is marked exclusive (E). In other embodiments, the consumer's local cache 1308 may simply return an acknowledgment (ACKN) 1340 back to home agent without any further action (e.g., no writeback and/or change to coherency state of target cache line).

Upon receiving response 1340, home agent 1306 may write the cache line, if one was included, into memory. Upon completion of the cache line writeback, or if no cache line writeback was required or requested, the home agent 1306 sends a message 1342 back to producer's local cache indicating ownership of the target cache line by the consumer's local cache 1308. A copy of the target cache line may or may not be included with message 1342. Irrespective of whether a copy of the cache line was included, the target cache line is not stored into the producer's local cache 1304.

Next, after receiving message 1342, or alternatively after receiving message 1337, producer 1318 sends data to be written into the target cache line via message 1344 to the consumer's local cache 1308. In one embodiment, message 1344 is forwarded by the home agent 1306 to the consumer's local cache 1308. According to the embodiment, the target cache line in the consumer's local cache 1308 is updated with data 1318 and marked as modified (M) (i.e., 1320). In a sense, the target cache line is updated directly by the producer 1302 utilizing the cache controller of the consumer's local cache 1308. However, in some embodiments, the data 1318 is first provided to consumer 1310 through a buffer (not shown) and later written into cache 1308 through the cache controller. Yet in another embodiment where the home agent 1306 had received the data to be written to the target cache line via write update/MOVPUT request 1334, the home agent may simply forward the data to the consumer's local cache 1308 upon determining or confirming that local cache 1308 is the sole owner of the target cache line.

It will be appreciated that since consumer's local cache 1308 has possessed initially, as well as maintained throughout the steps described above, sole ownership of the target cache line (i.e., in modified (M) or exclusive (E) state), it need not seek ownership of the target cache line in order to update it with data 1318. Furthermore, after the update, consumer's local cache 1308 will continue to have sole ownership of the target cache line. As such, a subsequent read 1346 for the target cache line by the consumer 1310 will not incur a miss its local cache 1308. Rather, the target cache line will simply be provided by the local cache 1308 to the consumer 1310 via response 1348.

Compared to the conventional approach illustrated in FIG. 12, the new approach in FIG. 13 eliminates the ping-pong effect between producers and consumers during the contention for cache line ownership. This not only saves processing time, but also the associated resources and messaging overheads.

Figure 14:
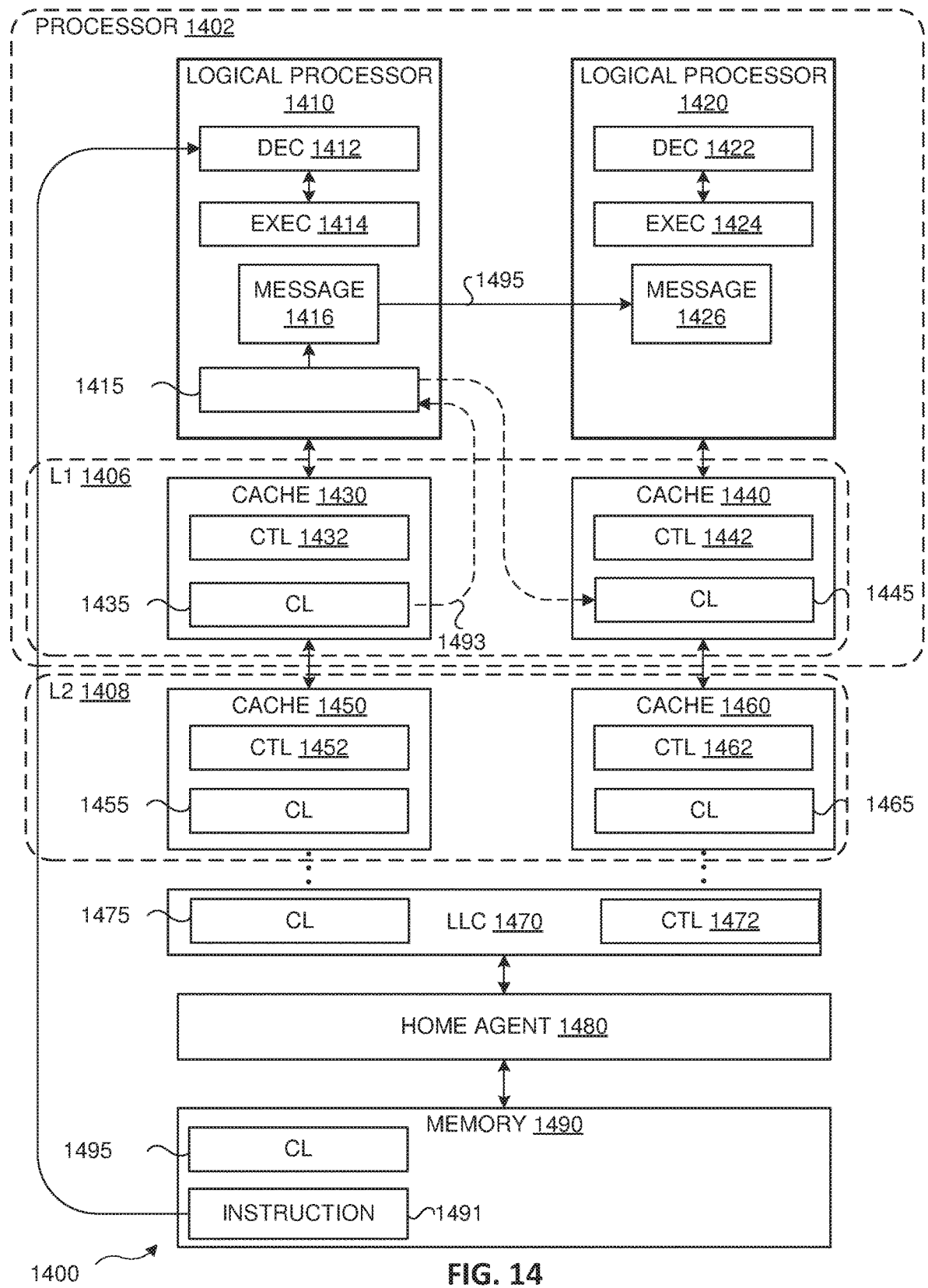
FIG. 14 illustrates a block diagram for an embodiment of a system for using an instruction to provide in place write update functionality.

FIG. 14 illustrates a block diagram for an embodiment of a system 1400 for using an instruction (i.e., MOVPUT instruction) to provide in place write update functionality. System 1400 includes a home agent 1480, system memory 1490 and a processor 1402. Processor 1402 comprises a first logical processor (e.g., hardware thread or processor core) 1410 and a second logical processor 1420. It will be appreciated that while processor 1402 is illustrated, for simplicity, as comprising two logical processors each representing a single hardware thread, the invention is not so limited. For example, it is typical for processors such as processor 1402, or other processors illustrated herein, to have several logical processors, which may or may not share some physical resources and or circuitry. Each logical processor may have a plurality of hardware threads capable of simultaneously or concurrently executing software threads. Logical processor 1410 has a decode stage or circuitry 1412 and one or more execution units or circuitries, e.g. execution unit 1414. Logical processor 1420 has a decode stage or circuitry 1422 and one or more execution units or circuitries, e.g. execution unit 1424. Logical processors 1410 and 1420 each have one or more caches in a cache hierarchy to store cache coherent data in cache lines. For example, logical processor 1410 has caches 1430 and 1450 and logical processor 1420 has caches 1440 and 1460. Caches 1430 and 1440 are level 1 (L1) caches 1406 and include controllers 1432 and 1442, respectively. Caches 1450 and 1460 are level 2 (L2) caches 1408 and include controllers 1452 and 1462, respectively. System 1400 further includes in its cache memory hierarchy a last level cache 1470 that includes controller 1472. The last level cache 1470 may be inclusive or exclusive of the L1 caches 1406 and/or of the L2 caches 1408. It will be appreciated that while processor 1402 is illustrated, for simplicity, to include only L1 caches 1406, other levels of the cache memory hierarchy, such as L2 caches 1408, could also be included in processor 1402.

Logical processor 1420 stores cache coherent data in a cache line 1445 for a shared memory address accessible by logical processors 1410 and 1420. The cache line 1445 includes or is associated with a cache coherency state which, in some embodiments, is used by the home agent 1480 and/or the various controllers (e.g., 1442) to ensure or enforce cache coherence. In some embodiments, the cache coherency state of cache line 1445 is set to modified (M), indicating that cache 1440 has sole ownership of cache line 1445. By extension, logical producer 1420, which includes cache 1440, also has sole ownership of cache line 1445. Alternatively, cache coherent data may be stored in another cache line (e.g., 1465) of another storage location (e.g., 1460), with an associated coherency state indicating the storage location has sole ownership of the cache line.

The decode stage 1412 of logical processor 1410 is to decode an instruction 1491 (e.g., MOVPUT) for execution. Instruction 1491 specifying a source data operand and a destination operand. The source data operand may identify a register (e.g., 1415) of the logical processor 1410 or a source memory address (e.g., 1435, 1455, 1475, or 1495). The destination operand may indicate a destination memory address (e.g., 1445), which is different from the source memory address. Moreover, the source and/or the destination operand may specify or indicate a data size, such as be 4, 8, 16, 32, or 64-bytes, etc. The size of the operands may vary.

Logical processor 1410 has one or more execution units or circuitries, e.g. execution unit 1414, to execute the decoded instruction 1491, to responsively cause data from the source data operand (e.g., 1415, 1435, 1455, 1475, or 1495) to the memory location specified by the destination operand (e.g., 1445), without changing the destination operand's cache coherency state (e.g., (M)odified) and/or location in the cache hierarchy (e.g., cache 1440). The copying of the data, according to some embodiments, are performed by utilizing the home agent 1480 and/or the various cache controllers (e.g., 1430). Embodiments of instruction 1491 provide an in place write update functionality, which permits logical processor 1410 to write data to cache line 1445 while keeping the sole ownership of cache coherent data in cache line 1445 in the memory location identified by the destination operand (e.g., cache 1440), so as to avoid incurring a cache miss upon a subsequent read to cache line 1445 in cache 1440 by logical processor 1420.

For some embodiments instruction 1491 (e.g., MOVPUT) may be decoded into one or more operations (e.g., in place write update 1493), also known as micro-operations, micro-ops, or uops. In some embodiments, responsive to the in place write update 1493, data may be loaded from the source data operand (e.g., 1435 or 1455 or some other source data operand) into a data buffer (e.g., 1415) utilizing cache control logic (e.g., control logic 1432 or 1452). A message 1495 with data may be then sent from messaging logic 1416 to messaging logic 1426 and the data may be stored into the destination operand 1445.

Figure 15:
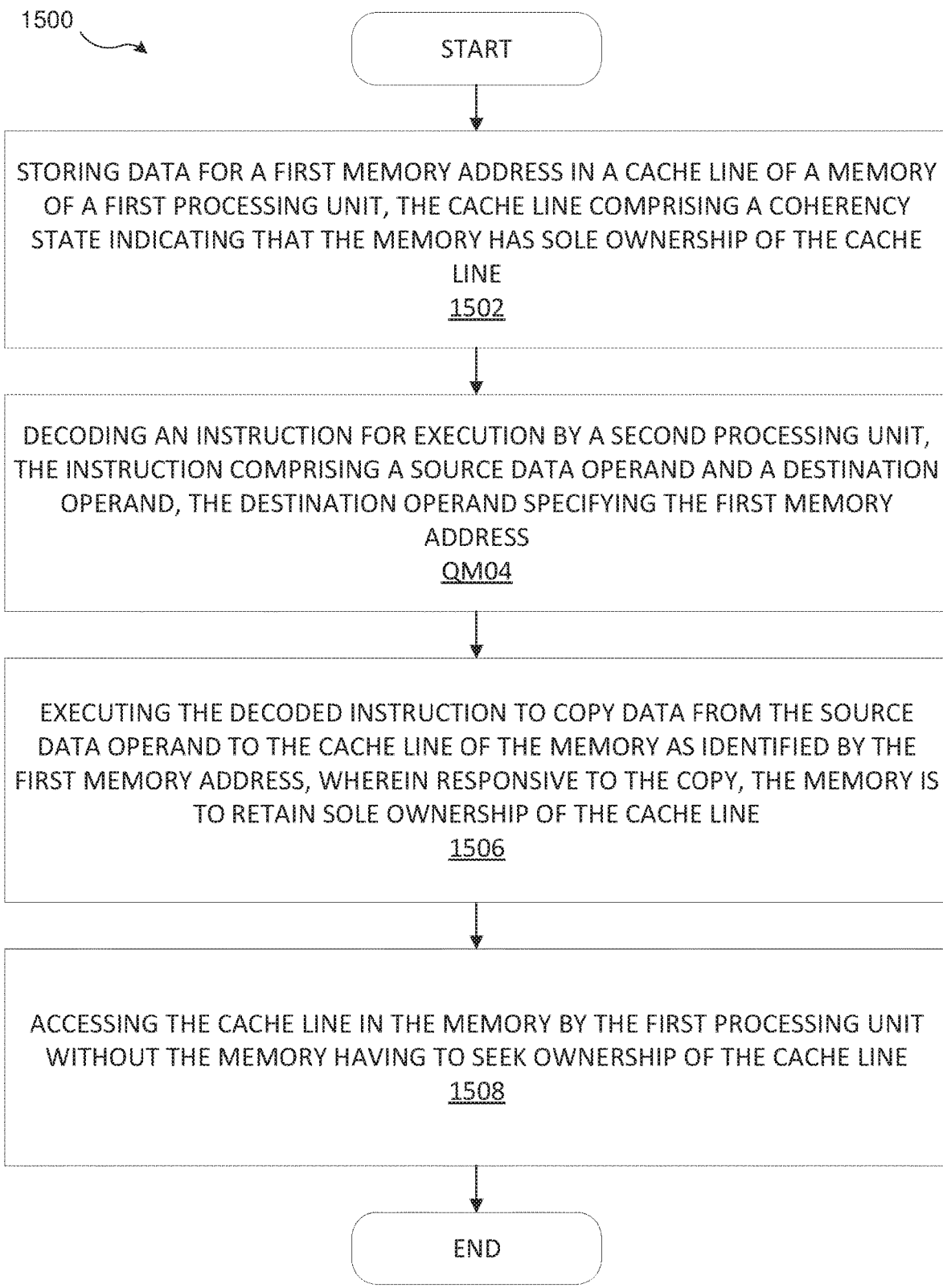
FIG. 15 is a flow diagram illustrating an embodiment of a process to provide in place write update functionality.

FIG. 15 illustrate a flow diagram for one embodiment of a process 1500 to provide in place write update functionality. Process 1500 and other processes herein disclosed are performed by processing blocks that may comprise dedicated hardware or software or firmware operation codes executable by general machines or by special purpose machines or by a combination of both.

In block 1502, data for a first memory address is stored in a cache line of a memory of a first processing unit. The cache line may include or be associated with a coherency state indicating that the memory has sole ownership of the cache line. The coherency state may be a modified (M) state. The memory may be a level 1 (L1) cache, level 2 (L2) cache/mid-level cache (MLC), level 3 (L3) cache/last-level cache (LLC), or system memory.

In block 1504, a second processing unit decodes an instruction for execution, the instruction comprising a source data operand and a destination operand, the destination operand specifying the first memory address. The instruction may be a MOVPUT instruction that when decoded and executed, triggers an in place write update operation. The source data operand may specify a register of the second processing unit. Alternatively, source data operand may specify a second memory address that is different from the first memory address. In an embodiment, the first or second memory address may be expressed as an offset to another memory address. Moreover, the source and/or the destination operand may specify or indicate a data size, such as 4, 8, 16, 32, or 64-bytes, etc. The size of the operands may vary.

In block 1506, the second processing unit, responsive to executing the decoded instruction, causes data from the source data operand to be copied to the cache line of the memory of the first processing unit, as identified by the first memory address. As a result of the copy, the cache line is to remain in the memory of the first processing unit and memory is to retain sole ownership of the cache line.

In block 1508, the cache line in the memory of the first processing unit is accessed (e.g., a write to the cache line) without the memory having to seek ownership of the cache line.

Figure 16:
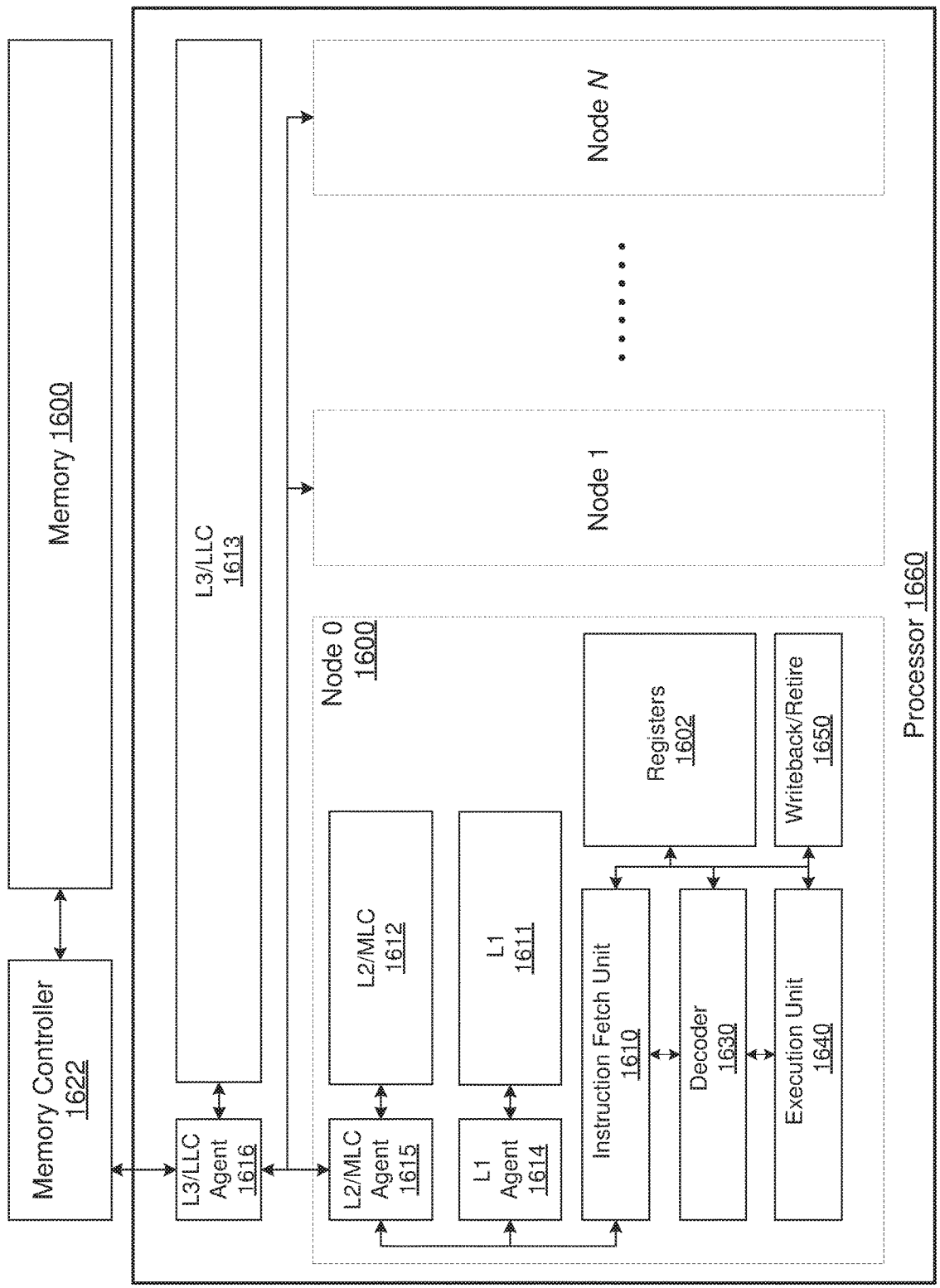
FIG. 16 is a block diagram illustrating an exemplary system on which embodiments of the present invention may be implemented.

FIG. 16 illustrates an embodiment of a system detail. According to the embodiment, one or more nodes may reside in a chip multi-processor (CMP), such as processor 1660. In some embodiments, each node constitutes, or includes, a processor core (core), logical processor, or hardware thread. The details of a single node (i.e., node 0) are illustrated in FIG. 16 for simplicity. It will be understood, however, that each node may have the same set of logic, components, circuitry, and/or configuration as node 0. For example, each node may include a set of registers 1602, a level 1 cache (L1) 1611, and a L2 (L2) or mid-level cache (MLC) 1612. In some embodiments, as shown in FIG. 16, processor 1660 further includes a level 3 (L3) cache or LLC 1613 that is communicatively coupled to, and shared by, all the nodes. In other embodiments (not shown), the L3/LLC 1613 is physically distributed and logically shared among the nodes. Each of L1, L2/MLC, and L3/LLC caches, according to an embodiment, is managed by a respective cache agent or controller (1614-1616) and usable for caching instructions and data according to a specified cache management policy. One or more cache agents or controllers may be used to perform the functions of a home agent, which may utilize directories to ensure or enforce cache coherence. In at least some embodiments, the cache management policy further includes a cache eviction/replacement policy. The instructions and data stored within the various processor caches are managed at the granularity of cache lines which may be a fixed size (e.g., 64, 128, 512 Bytes in length). Each node of the exemplary embodiments further includes an instruction fetch unit 1610 for fetching instructions from main memory 1600 via memory controller 1622 and/or from the shared LLC 1613 via L3/LLC agent 1616; a decode unit 1630 for decoding the instructions (e.g., decoding program instructions into micro-operations or "uops"); an execution unit 1640 for executing the decoded instructions; and a writeback unit 1650 for retiring the instructions and writing back the results.

It is important to note that the semantics of both MOVGET and MOVPUT instructions are to allow the flow of data between a producer and a consumer, while avoiding the disturbance of data that is being actively used by the producer, consumer, and/or other cores. In light of this, both the MOVGET and MOVPUT instructions, as well as the associated operations or transactions (i.e., read snapshot and in place write update), may receive special treatment throughout the memory hierarchy. For example, hardware prefetchers, which exploit spatial locality by fetching nearby data into a core's cache, do not treat read snapshot and in place write update operations the same way as conventional loads and stores. In the case of conventional loads and stores, prefetching makes sense since the goal is to acquire a copy not just of the requested data but other nearby data as well. However, in situations where the nearby data is not needed or requested, their acquisition may negatively impact performance. As such, according to an embodiment, MOVGET/MOVPUT instructions and the associated operations are to be ignored by hardware prefetchers to avoid disturbing nearby data resident on other cores. Temporary buffers may also be used for MOVGET/MOVPUT instructions and their associated operations to prevent accidentally or incorrectly filling data into caches, which may cause pollution and incorrect results.

An example of the present invention is a method that includes: storing data for a first memory address in a cache line of a memory of a first processing unit, the cache line including a coherency state indicating that the memory has sole ownership of the cache line; decoding an instruction for execution by a second processing unit, the instruction including a source data operand specifying the first memory address and a destination operand specifying a memory location of the second processing unit; executing the decoded instruction by copying data from the cache line of the memory of the first processing unit, as identified by the first memory address, to the memory location of the second processing unit such that responsive to the copy, the cache line is to remain in the memory and its coherency state is to remain unchanged; and accessing the cache line in the memory by the first processing unit without the memory having to seek ownership of the cache line. The memory may be a level 1 (L1) cache, level 2 (L2) cache/mid-level cache (MLC), level 3 (L3) cache/last-level cache (LLC), or system memory. The memory location may be a register. Alternatively, the memory location may be a second memory address different from the first memory address. The coherency state may be a Modified (M) or Exclusive (E) state. The instruction may be a MOVGET instruction to provide read snapshot functionality and its source and/or destination operands may specify a data size, such as 4, 8, 16, 32, or 64-bytes.

Another example of the present invention is a method that includes storing data for a first memory address in a cache line of a memory of a first processing unit, the cache line including a coherency state indicating that the memory has sole ownership of the cache line; decoding an instruction for execution by a second processing unit, the instruction including a source data operand and a destination operand, the destination operand specifying the first memory address; executing the decoded instruction by copying data from the source data operand to the cache line of the memory as identified by the first memory address, such that responsive to the copy, the memory is to retain sole ownership of the cache line; and accessing the cache line in the memory by the first processing unit without the memory having to seek ownership of the cache line. The memory may be a level 1 (L1) cache, level 2 (L2) cache/mid-level cache (MLC), level 3 (L3) cache/last-level cache (LLC), or system memory. The source data operand may specify a second memory address different from the first memory address. Alternatively, the source data operand may specify a register. The coherency state may be a Modified (M) state. The instruction may be a MOVPUT instruction to provide in place write update functionality and its source and/or destination operands may specify a data size, such as 4, 8, 16, 32, or 64-bytes.

Another example of the present invention is a system that includes: a first processing unit including a memory to store data for a first memory address in a cache line, the cache line including a coherency state indicating that the memory has sole ownership of the cache line; decoder circuitry to decode an instruction, the instruction including a source data operand specifying the first memory address and a destination operand specifying a memory location of a second processing unit; execution circuitry to execute the decoded instruction and copy data from the cache line to the memory location of the second processing unit, such that responsive to the copy, the cache line is to remain in the memory of the first processing unit and the coherency state is to remain unchanged; and the first processing unit to access the cache line in the memory without the memory having to seek ownership of the cache line. The memory may be a level 1 (L1) cache, level 2 (L2) cache/mid-level cache (MLC), level 3 (L3) cache/last-level cache (LLC), or system memory. The memory location may be a register. Alternatively, the memory location may be a second memory address different from the first memory address. The coherency state may be a Modified (M) or Exclusive (E) state. The instruction may be a MOVGET instruction to provide read snapshot functionality and its source and/or destination operands may specify a data size, such as 4, 8, 16, 32, or 64-bytes.

Another example of the present invention is a system that includes a first processing unit including a memory to store data for a first memory address in a cache line, the cache line including a coherency state indicating that the memory has sole ownership of the cache line; decoder circuitry to decode an instruction, the instruction including a source data operand and a destination operand, the destination operand specifying the first memory address; execution circuitry to execute the decoded instruction and copy data from the source data operand to the cache line of the memory as identified by the first memory address, such that responsive to the copy, the memory is to retain sole ownership of the cache line; and the first processing unit to access the cache line in the memory without the memory having to seek ownership of the cache line. The memory may be a level 1 (L1) cache, level 2 (L2) cache/mid-level cache (MLC), level 3 (L3) cache/last-level cache (LLC), or system memory. The source data operand may specify a second memory address different from the first memory address. Alternatively, the source data operand may specify a register. The coherency state may be a Modified (M) state. The instruction may be a MOVPUT instruction to provide in place write update functionality and its source and/or destination operands may specify a data size, such as 4, 8, 16, 32, or 64-bytes.

Another example of the present invention is a non-transitory machine-readable medium having program code stored thereon which, when executed by a machine, causes the machine to perform operations of: storing data for a first memory address in a cache line of a memory of a first processing unit, the cache line including a coherency state indicating that the memory has sole ownership of the cache line; decoding an instruction for execution by a second processing unit, the instruction including a source data operand specifying the first memory address and a destination operand specifying a memory location of the second processing unit; responsive to executing the decoded instruction, copying data from the cache line of the memory of the first processing unit, as identified by the first memory address, to the memory location of the second processing unit, such that responsive to the copy, the cache line is to remain in the memory and the coherency state is to remain unchanged; and accessing the cache line in the memory by the first processing unit without the memory having to seek ownership of the cache line. The memory may be a level 1 (L1) cache, level 2 (L2) cache/mid-level cache (MLC), level 3 (L3) cache/last-level cache (LLC), or system memory. The memory location may be a register. Alternatively, the memory location may be a second memory address different from the first memory address. The coherency state may be a Modified (M) or Exclusive (E) state. The instruction may be a MOVGET instruction to provide read snapshot functionality and its source and/or destination operands may specify a data size, such as 4, 8, 16, 32, or 64-bytes.

Yet another example of the present invention is a non-transitory machine-readable medium having program code stored thereon which, when executed by a machine, causes the machine to perform operations of: storing data for a first memory address in a cache line of a memory of a first processing unit, the cache line including a coherency state indicating that the memory has sole ownership of the cache line; decoding an instruction for execution by a second processing unit, the instruction including a source data operand and a destination operand, the destination operand specifying the first memory address; executing the decoded instruction to copy data from the source data operand to the cache line of the memory as identified by the first memory address, such that responsive to the copy, the memory is to retain sole ownership of the cache line; and accessing the cache line in the memory by the first processing unit without the memory having to seek ownership of the cache line. The memory may be a level 1 (L1) cache, level 2 (L2) cache/ mid-level cache (MLC), level 3 (L3) cache/last-level cache (LLC), or system memory. The source data operand may specify a second memory address different from the first memory address. Alternatively, the source data operand may specify a register. The coherency state may be a Modified (M) state. The instruction may be a MOVPUT instruction to provide in place write update functionality and its source and/or destination operands may specify a data size, such as 4, 8, 16, 32, or 64-bytes.

Figure 17:
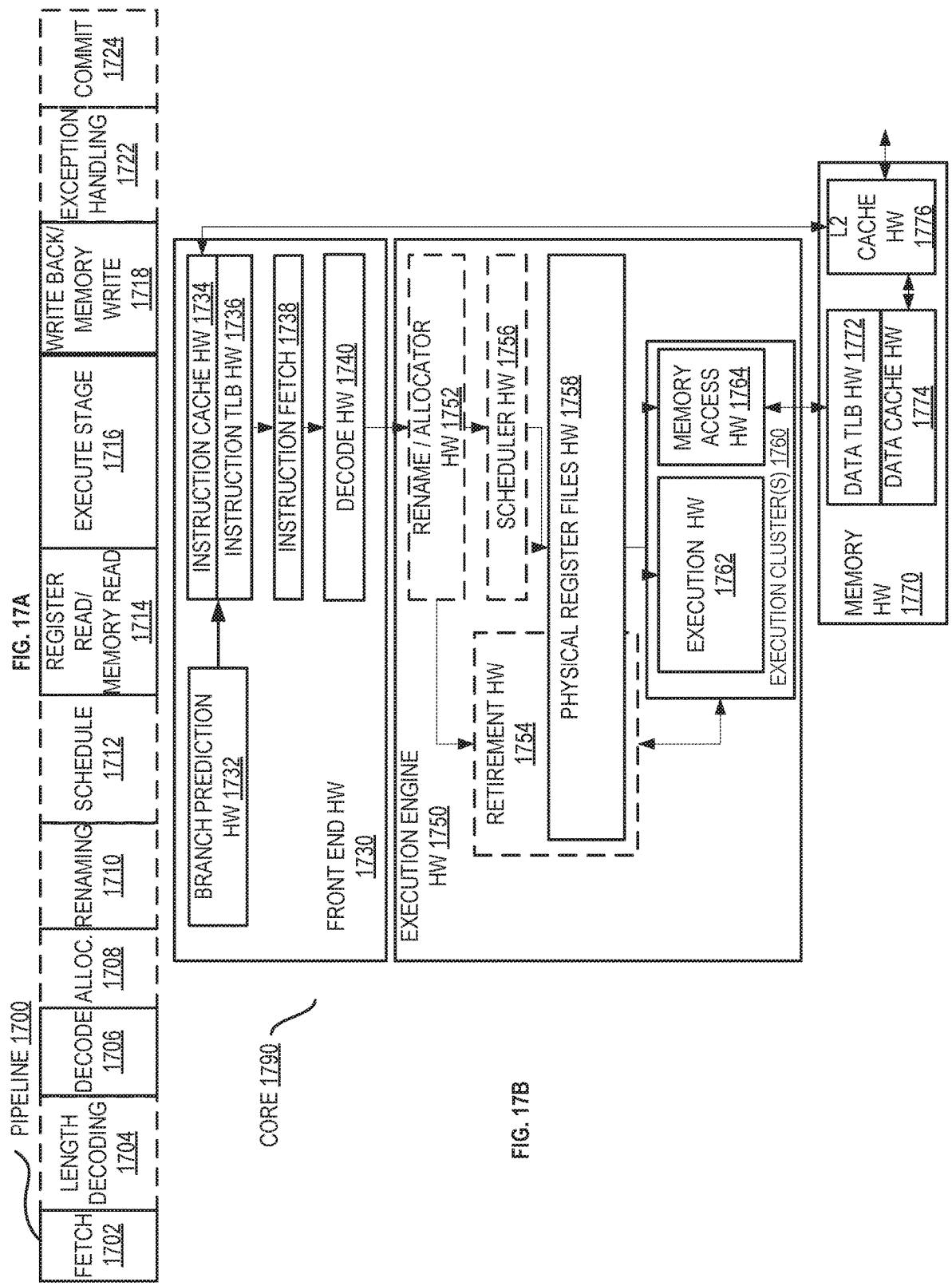
FIG. 17A is a block diagram illustrating both an exemplary in-order pipeline and an exemplary register renaming, out-of-order issue/execution pipeline according to embodiments of the invention.
FIG. 17B is a block diagram illustrating both an exemplary embodiment of an in-order architecture core and an exemplary register renaming, out-of-order issue/execution architecture core to be included in a processor according to embodiments of the invention.

FIG. 17A is a block diagram illustrating both an exemplary in-order pipeline and an exemplary register renaming, out-of-order issue/execution pipeline according to embodiments of the invention. FIG. 17B is a block diagram illustrating both an exemplary embodiment of an in-order architecture core and an exemplary register renaming, out-of-order issue/execution architecture core to be included in a processor according to embodiments of the invention. The solid lined boxes in FIGS. 17A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 17A, a processor pipeline 1700 includes a fetch stage 1702, a length decode stage 1704, a decode stage 1706, an allocation stage 1708, a renaming stage 1710, a scheduling (also known as a dispatch or issue) stage 1712, a register read/memory read stage 1714, an execute stage 1716, a write back/memory write stage 1718, an exception handling stage 1722, and a commit stage 1724.

FIG. 17B shows processor core 1790 including a front end hardware 1730 coupled to an execution engine hardware 1750, and both are coupled to a memory hardware 1770. The core 1790 may be a reduced instruction set computing (RISC) core, a complex instruction set computing (CISC) core, a very long instruction word (VLIW) core, or a hybrid or alternative core type. As yet another option, the core 1790 may be a special-purpose core, such as, for example, a network or communication core, compression engine, coprocessor core, general purpose computing graphics processing unit (GPGPU) core, graphics core, or the like.

The front end hardware 1730 includes a branch prediction hardware 1732 coupled to an instruction cache hardware 1734, which is coupled to an instruction translation lookaside buffer (TLB) 1736, which is coupled to an instruction fetch hardware 1738, which is coupled to a decode hardware 1740. The decode hardware 1740 (or decoder) may decode instructions, and generate as an output one or more micro-operations, micro-code entry points, microinstructions, other instructions, or other control signals, which are decoded from, or which otherwise reflect, or are derived from, the original instructions. The decode hardware 1740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1790 includes a microcode ROM or other medium that stores microcode for certain macroinstructions (e.g., in decode hardware 1740 or otherwise within the front end hardware 1730). The decode hardware 1740 is coupled to a rename/allocator hardware 1752 in the execution engine hardware 1750.

The execution engine hardware 1750 includes the rename/allocator hardware 1752 coupled to a retirement hardware 1754 and a set of one or more scheduler hardware 1756. The scheduler hardware 1756 represents any number of different schedulers, including reservations stations, central instruction window, etc. The scheduler hardware 1756 is coupled to the physical register file(s) hardware 1758. Each of the physical register file(s) hardware 1758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1758 comprises a vector registers hardware, a write mask registers hardware, and a scalar registers hardware. This register hardware may provide architectural vector registers, vector mask registers, and general purpose registers. The physical register file(s) hardware 1758 is overlapped by the retirement hardware 1754 to illustrate various ways in which register renaming and out-of-order execution may be implemented (e.g., using a reorder buffer (s) and a retirement register file(s); using a future file(s), a history buffer(s), and a retirement register file(s); using a register maps and a pool of registers; etc.). The retirement hardware 1754 and the physical register file(s) hardware 1758 are coupled to the execution cluster(s) 1760. The execution cluster(s) 1760 includes a set of one or more execution hardware 1762 and a set of one or more memory access hardware 1764. The execution hardware 1762 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1756, physical register file(s) hardware 1758, and execution cluster(s) 1760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1764). It should also be understood that where separate pipelines are used, one or more of these pipelines may be out-of-order issue/execution and the rest in-order.

The set of memory access hardware 1764 is coupled to the memory hardware 1770, which includes a data TLB hardware 1772 coupled to a data cache hardware 1774 coupled to a level 2 (L2) cache hardware 1776. In one exemplary embodiment, the memory access hardware 1764 may include a load hardware, a store address hardware, and a store data hardware, each of which is coupled to the data TLB hardware 1772 in the memory hardware 1770. The instruction cache hardware 1734 is further coupled to a level 2 (L2) cache hardware 1776 in the memory hardware 1770. The L2 cache hardware 1776 is coupled to one or more other levels of cache and eventually to a main memory.

By way of example, the exemplary register renaming, out-of-order issue/execution core architecture may implement the pipeline 1700 as follows: 1) the instruction fetch 1738 performs the fetch and length decoding stages 1702 and 1704; 2) the decode hardware 1740 performs the decode stage 1706; 3) the rename/allocator hardware 1752 performs the allocation stage 1708 and renaming stage 1710; 4) the scheduler hardware 1756 performs the schedule stage 1712; 5) the physical register file(s) hardware 1758 and the memory hardware 1770 perform the register read/memory read stage 1714; the execution cluster 1760 perform the execute stage 1716; 6) the memory hardware 1770 and the physical register file(s) hardware 1758 perform the write back/memory write stage 1718; 7) various hardware may be involved in the exception handling stage 1722; and 8) the retirement hardware 1754 and the physical register file(s) hardware 1758 perform the commit stage 1724.

The core 1790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1790 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1734/1774 and a shared L2 cache hardware 1776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 18:
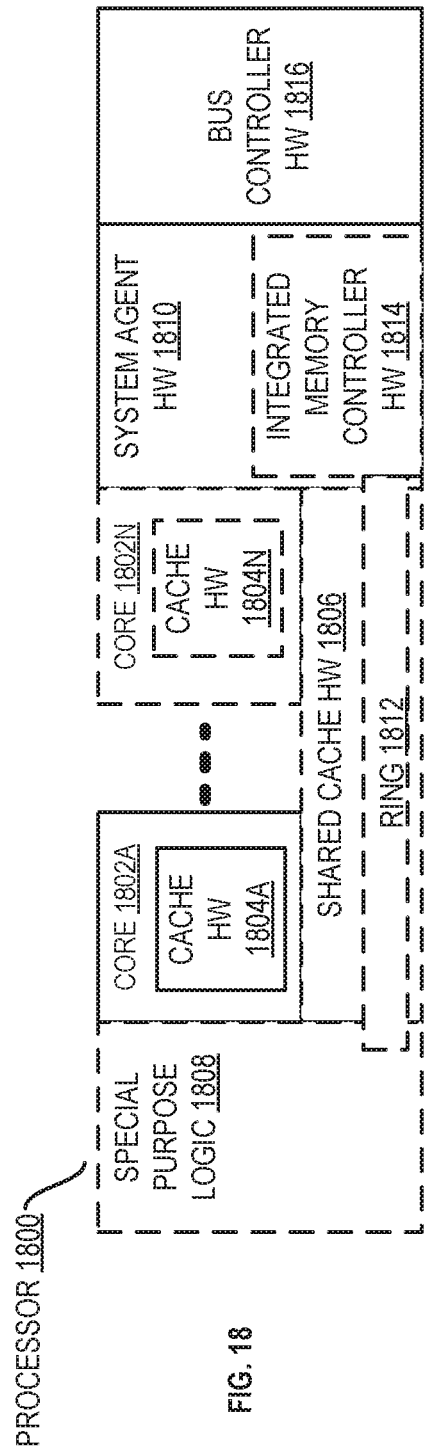
FIG. 18 is a block diagram of a single core processor and a multicore processor with integrated memory controller and graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller hardware 1816, while the optional addition of the dashed lined boxes illustrates an alternative processor 1800 with multiple cores 1802A-N, a set of one or more integrated memory controller hardware 1814 in the system agent hardware 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1806, and external memory (not shown) coupled to the set of integrated memory controller hardware 1814. The set of shared cache hardware 1806 may include one or more mid-level caches, such as level 2 (L2), level 3 (L3), level 4 (L4), or other levels of cache, a last level cache (LLC), and/or combinations thereof. While in one embodiment a ring based interconnect hardware 1812 interconnects the integrated graphics logic 1808, the set of shared cache hardware 1806, and the system agent hardware 1810/integrated memory controller hardware 1814, alternative embodiments may use any number of well-known techniques for interconnecting such hardware. In one embodiment, coherency is maintained between one or more cache hardware 1806 and cores 1802-A-N.

In some embodiments, one or more of the cores 1802A-N are capable of multithreading. The system agent 1810 includes those components coordinating and operating cores 1802A-N. The system agent hardware 1810 may include for example a power control unit (PCU) and a display hardware. The PCU may be or include logic and components needed for regulating the power state of the cores 1802A-N and the integrated graphics logic 1808. The display hardware is for driving one or more externally connected displays.

The cores 1802-A-N may be homogenous or heterogeneous in terms of architecture instruction set; that is, two or more of the cores 1802-A-N may be capable of execution the same instruction set, while others may be capable of executing only a subset of that instruction set or a different instruction set. In one embodiment, the cores 1802A-N are heterogeneous and include both the "small" cores and "big" cores described below.

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
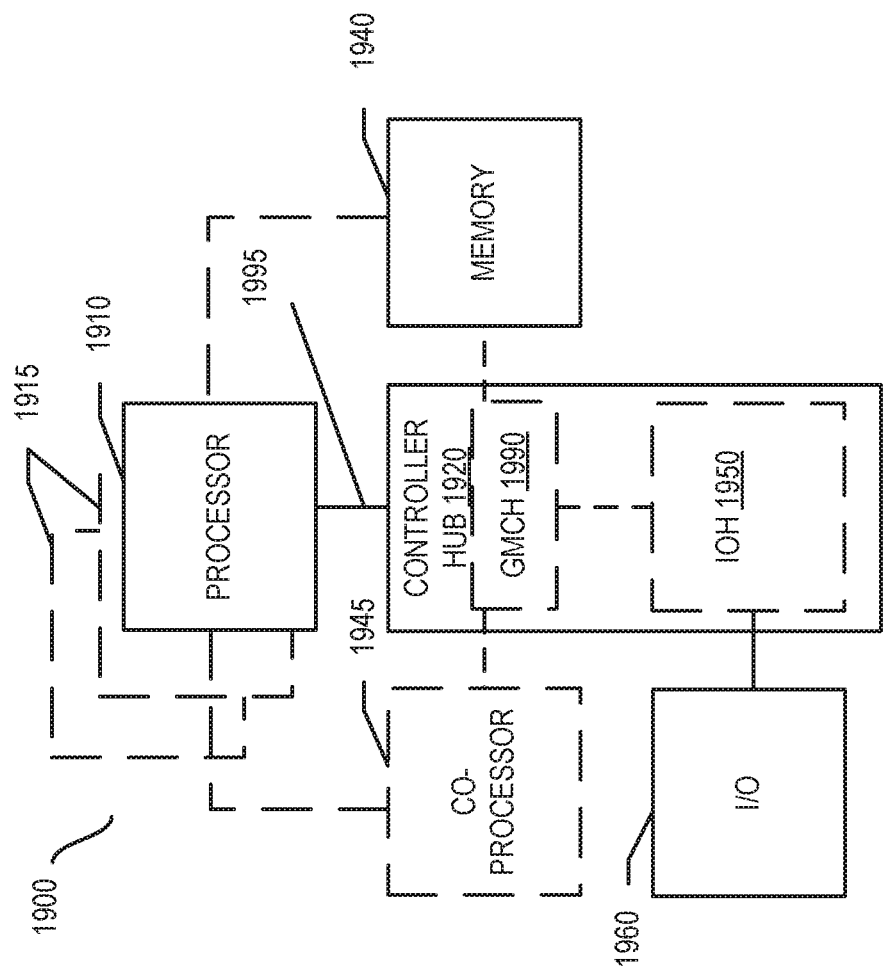
FIG. 19 illustrates a block diagram of a system in accordance with one embodiment of the present invention.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface, or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
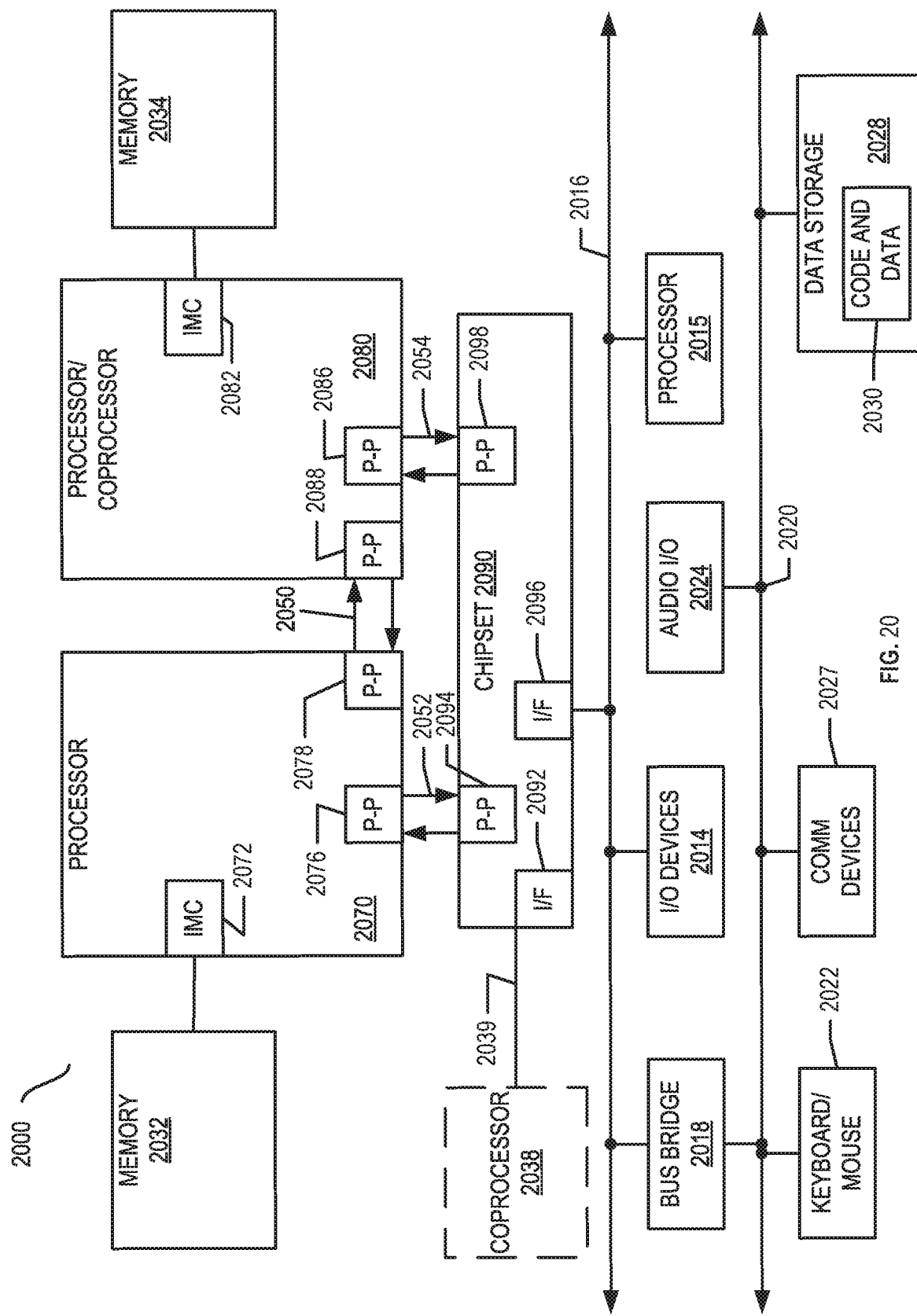
FIG. 20 illustrates a block diagram of a second system in accordance with an embodiment of the present invention.

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) hardware 2072 and 2082, respectively. Processor 2070 also includes as part of its bus controller hardware point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) hardware), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage hardware 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multidrop bus or other such architecture.

Figure 21:
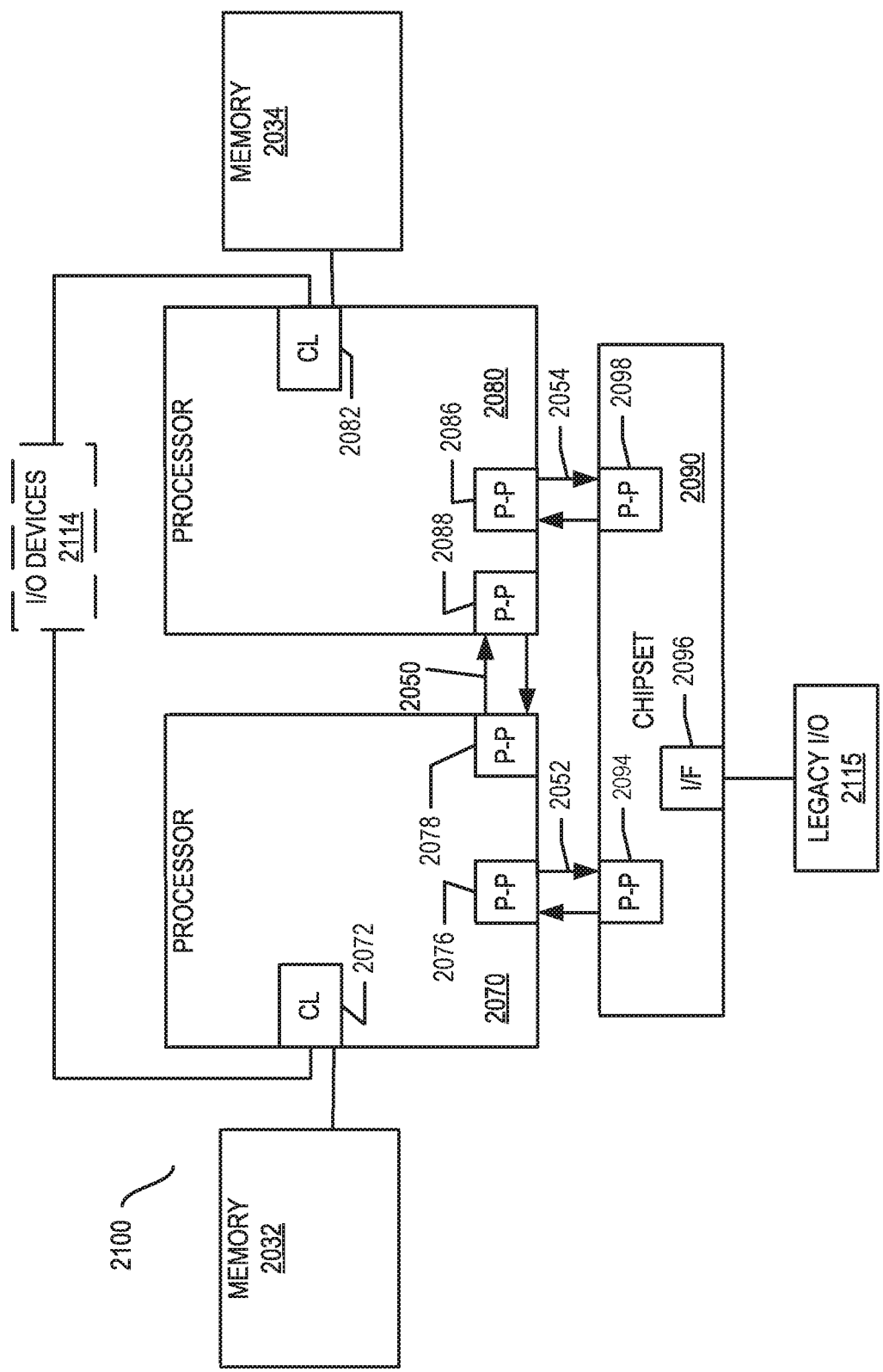
FIG. 21 illustrates a block diagram of a third system in accordance with an embodiment of the present invention.

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller hardware and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
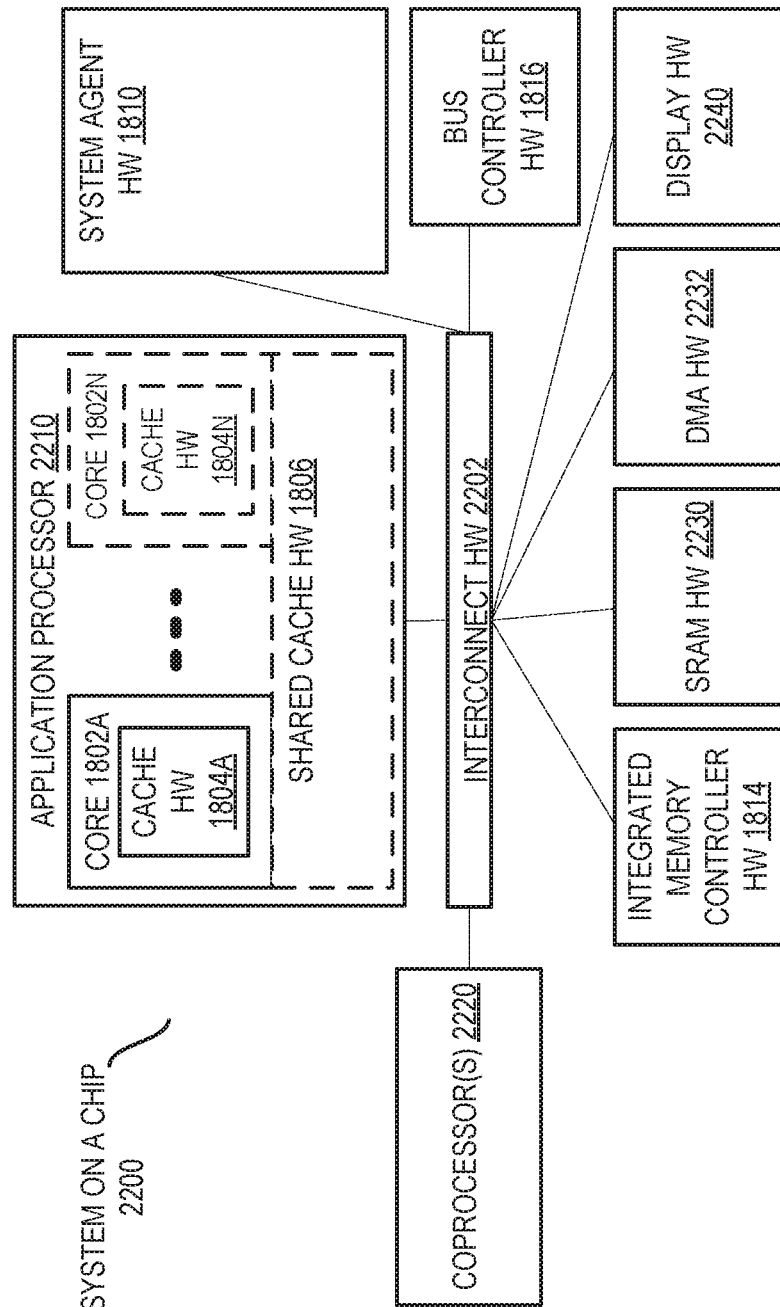
FIG. 22 illustrates a block diagram of a system on a chip (SoC) in accordance with an embodiment of the present invention.

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect hardware 2202 is coupled to: an application processor 2210 which includes a set of one or more cores 1802A-N and shared cache hardware 1806; a system agent hardware 1810; a bus controller hardware 1816; an integrated memory controller hardware 1814; a set or one or more coprocessors 2220 which may include integrated graphics logic, an image processor, an audio processor, and a video processor; an static random access memory (SRAM) hardware 2230; a direct memory access (DMA) hardware 2232; and a display hardware 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
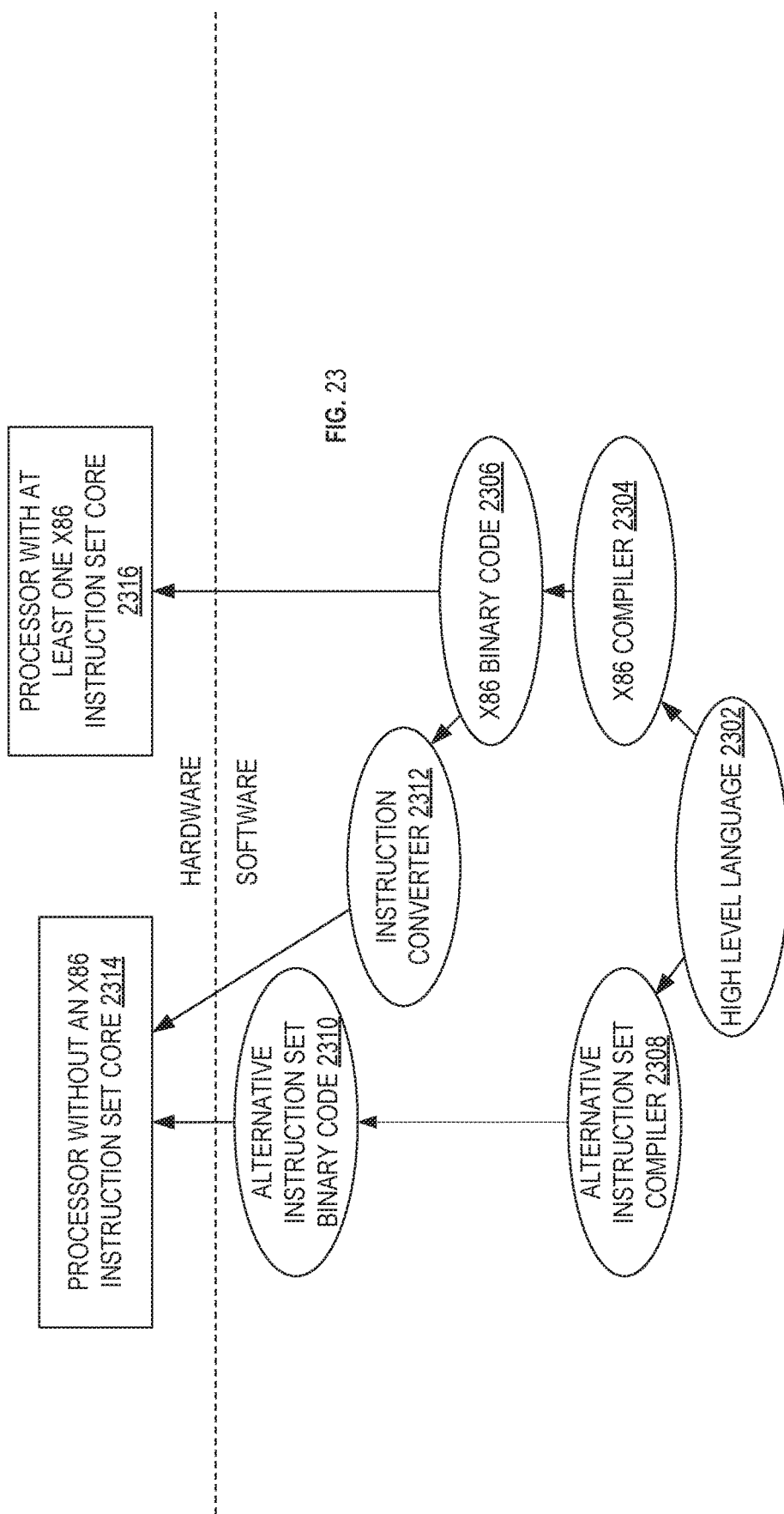
FIG. 23 illustrates a block diagram contrasting the use of a software instruction converter to convert binary instructions in a source instruction set to binary instructions in a target instruction set according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:
1. A method comprising:
 storing data associated with a first memory address in a cache line of a memory of a first processing unit, the cache line associated with a coherency state indicating that the memory has sole ownership of the cache line;
 decoding an instruction for execution by a second processing unit, the instruction comprising a source data operand specifying the first memory address usable to identify the data;
 executing, by the second processing unit, the decoded instruction by copying the data, as identified by the first memory address, from the cache line of the memory of the first processing unit to a register of the second processing unit, wherein responsive to the copy, the data stored in the cache line is to remain in the memory of the first processing unit and the coherency state associated with the cache line is to remain unchanged; and accessing the cache line in the memory by the first processing unit without the memory having to seek ownership of the cache line.

2. The method of claim 1, wherein the memory is a level 1 (L1) cache, level 2 (L2) cache/mid-level cache (MLC), level 3 (L3) cache/last-level cache (LLC), or system memory.

3. The method of claim 1, wherein the coherency state is a Modified (M) or Exclusive (E) state.

4. The method of claim 1, wherein the instruction is a MOVGET instruction to provide read snapshot functionality.

5. The method of claim 1, wherein the source and/or the destination operands to specify a data size, the data size being 4, 8, 16, 32, or 64-bytes.

6. The method of claim 1, wherein the data is not copied to any cache of the second processing unit.

7. A method comprising:
storing a first data associated with a first memory address in a cache line of a memory of a first processing unit, the cache line associated with a coherency state indicating that the memory has sole ownership of the cache line;
decoding an instruction for execution by a second processing unit, the instruction comprising a source data operand identifying a register to store a second data and a destination operand to specify the first memory address;
executing the decoded instruction by replacing the first data stored in the cache line of the memory of the first processing unit with the second data from the register, wherein subsequent to executing the decoded instruction, the memory of the first processing unit is to retain sole ownership of the cache line; and
accessing the second data in the cache line in the memory by the first processing unit without the memory having to seek ownership of the cache line.

8. The method of claim 7, wherein the memory is a level 1 (L1) cache, level 2 (L2) cache/mid-level cache (MLC), level 3 (L3) cache/last-level cache (LLC), or system memory.

9. The method of claim 7, wherein the coherency state is a Modified (M) state.

10. The method of claim 7, wherein the instruction is a MOVPUT instruction to provide in place write update functionality.

11. The method of claim 7, wherein the source and/or the destination operands to specify a data size, the data size being 4, 8, 16, 32, or 64-bytes.

12. A system comprising:
a first processing unit comprising a memory to store data associated with a first memory address in a cache line of the memory, the cache line associated with a coherency state indicating that the memory has sole ownership of the cache line; and
a second processing unit comprising:
decoder circuitry to decode an instruction, the instruction comprising a source data operand specifying the first memory address usable to identify the data;
execution circuitry to execute the decoded instruction and copy data, as identified by the first memory address, from the cache line to a register of the second processing unit, wherein responsive to the copy, the data stored in the cache line is to remain in the memory of the first processing unit and the coherency state associated with the cache line is to remain unchanged;
wherein the first processing unit is to access the cache line in the memory without the memory having to seek ownership of the cache line.

13. The system of claim 12, wherein the memory is a level 1 (L1) cache, level 2 (L2) cache/mid-level cache (MLC), level 3 (L3) cache/last-level cache (LLC), or system memory.

14. The system of claim 12, wherein the coherency state is a Modified (M) or Exclusive (E) state.

15. The system of claim 12, wherein the instruction is a MOVGET instruction to provide read snapshot functionality.

16. The system of claim 12, wherein the source and/or the destination operands to specify a data size, the data size being 4, 8, 16, 32, or 64-bytes.

17. A system comprising:
a first processing unit comprising a memory to store a first data associated with a first memory address in a cache line of the memory, the cache line associated with a coherency state indicating that the memory has sole ownership of the cache line; and
a second processing unit comprising:
a register to store a second data;
decoder circuitry to decode an instruction, the instruction comprising a source data operand to identify the register storing the second data and a destination operand to specify the first memory address;
execution circuitry to execute the decoded instruction and replace the first data stored in the cache line of the memory of the first processing unit with the second data from the register, wherein subsequent to executing the decoded instruction, the memory of the first processing unit is to retain sole ownership of the cache line; and
wherein the first processing unit is to access second data in the cache line in the memory without the memory having to seek ownership of the cache line.

18. The system of claim 17, wherein the memory is a level 1 (L1) cache, level 2 (L2) cache/mid-level cache (MLC), level 3 (L3) cache/last-level cache (LLC), or system memory.

19. The system of claim 17, wherein the coherency state is a Modified (M) state.

20. The system of claim 17, wherein the instruction is a MOVPUT instruction to provide in place write update functionality.

21. The system of claim 17, wherein the source and/or the destination operands to specify a data size, the data size being 4, 8, 16, 32, or 64-bytes.

* * * * *